United States Patent
Hancock, Jr. et al.

(10) Patent No.: US 11,208,344 B2
(45) Date of Patent: Dec. 28, 2021

(54) TEXTURED GLASS ARTICLES AND METHODS OF MAKING THE SAME

(71) Applicant: CORNING INCORPORATED, Corning, NY (US)

(72) Inventors: Robert Randall Hancock, Jr., Corning, NY (US); Kelleen Kaye Hughes, South Waverly, PA (US); Yuhui Jin, Painted Post, NY (US); Aize Li, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 177 days.

(21) Appl. No.: 15/915,325

(22) Filed: Mar. 8, 2018

(65) Prior Publication Data

US 2018/0282201 A1    Oct. 4, 2018

Related U.S. Application Data

(60) Provisional application No. 62/477,592, filed on Mar. 28, 2017.

(51) Int. Cl.
*C03C 3/083*    (2006.01)
*C03C 17/30*    (2006.01)
(Continued)

(52) U.S. Cl.
CPC .............. *C03C 3/083* (2013.01); *C03C 3/091* (2013.01); *C03C 3/093* (2013.01); *C03C 3/097* (2013.01);
(Continued)

(58) Field of Classification Search
CPC ......... C03C 3/083; C03C 15/00; C03C 3/097; C03C 3/091; C03C 3/093; C03C 21/002;
(Continued)

(56) References Cited

U.S. PATENT DOCUMENTS 8,771,532 B2* 7/2014 Carlson .................. C03C 15/00
216/28
9,057,824 B2   6/2015 Gollier et al.
(Continued)

FOREIGN PATENT DOCUMENTS

CN    103534219 A    1/2014
WO    2012166407 A1   12/2012
(Continued)

OTHER PUBLICATIONS

International Search Report and Written Opinion of the International Searching Authority; PCT/US2018/022872; dated Jun. 19, 2018; 15 Pages; European Patent Office.
(Continued)

*Primary Examiner* — Anthony J Frost
(74) *Attorney, Agent, or Firm* — John P. McGroarty

(57) ABSTRACT

A textured glass article that includes: a glass substrate comprising a thickness, a primary surface and a bulk composition at the midpoint of the thickness; and a textured region defined by the primary surface and comprising a textured region composition. The textured region comprises a sparkle of 2% or less. Further, the bulk composition comprises about 40 mol % to 80 mol % silica and the textured region composition comprises at least about 40 mol % silica.

29 Claims, 17 Drawing Sheets

(51) Int. Cl.
  *C03C 15/02* (2006.01)
  *C03C 17/32* (2006.01)
  *C03C 21/00* (2006.01)
  *C03C 3/093* (2006.01)
  *C03C 3/091* (2006.01)
  *C03C 3/097* (2006.01)
  *C03C 15/00* (2006.01)
  *H04B 1/3888* (2015.01)

(52) U.S. Cl.
  CPC .............. *C03C 15/00* (2013.01); *C03C 15/02* (2013.01); *C03C 17/30* (2013.01); *C03C 17/32* (2013.01); *C03C 21/002* (2013.01); *C03C 2204/08* (2013.01); *C03C 2217/76* (2013.01); *C03C 2217/77* (2013.01); *C03C 2217/78* (2013.01); *H04B 1/3888* (2013.01)

(58) Field of Classification Search
  CPC ......... C03C 17/32; C03C 15/02; C03C 17/30; C03C 2204/08; C03C 2217/76; C03C 2217/78; C03C 2217/77; H04B 1/3888
  See application file for complete search history.

(56) References Cited

U.S. PATENT DOCUMENTS

| | | | |
|---|---|---|---|
| 9,411,180 B2 | 8/2016 | Gollier et al. | |
| 2004/0092396 A1* | 5/2004 | Glazer | B01J 19/0046 502/439 |
| 2009/0279170 A1* | 11/2009 | Miyazaki | G02B 5/3025 359/485.01 |
| 2011/0080643 A1* | 4/2011 | Niinou | G02B 1/118 359/599 |
| 2012/0218640 A1 | 8/2012 | Gollier et al. | |
| 2012/0300304 A1* | 11/2012 | Gollier | C03C 15/00 359/599 |
| 2015/0331149 A1* | 11/2015 | Bookbinder | G02B 5/0221 359/601 |
| 2016/0236974 A1 | 8/2016 | Sinapi et al. | |
| 2016/0280584 A1 | 9/2016 | Sinapi et al. | |

FOREIGN PATENT DOCUMENTS

| | | |
|---|---|---|
| WO | 2016040151 A | 3/2016 |
| WO | 2016069113 A1 | 5/2016 |
| WO | 2016201027 A2 | 12/2016 |

OTHER PUBLICATIONS

Chinese Patent Application No. 201880035133.9, Office Action dated Aug. 30, 2021, 11 pages (5 pages of English Translation and 6 pages of Original Document), Chinese Patent Office.

* cited by examiner

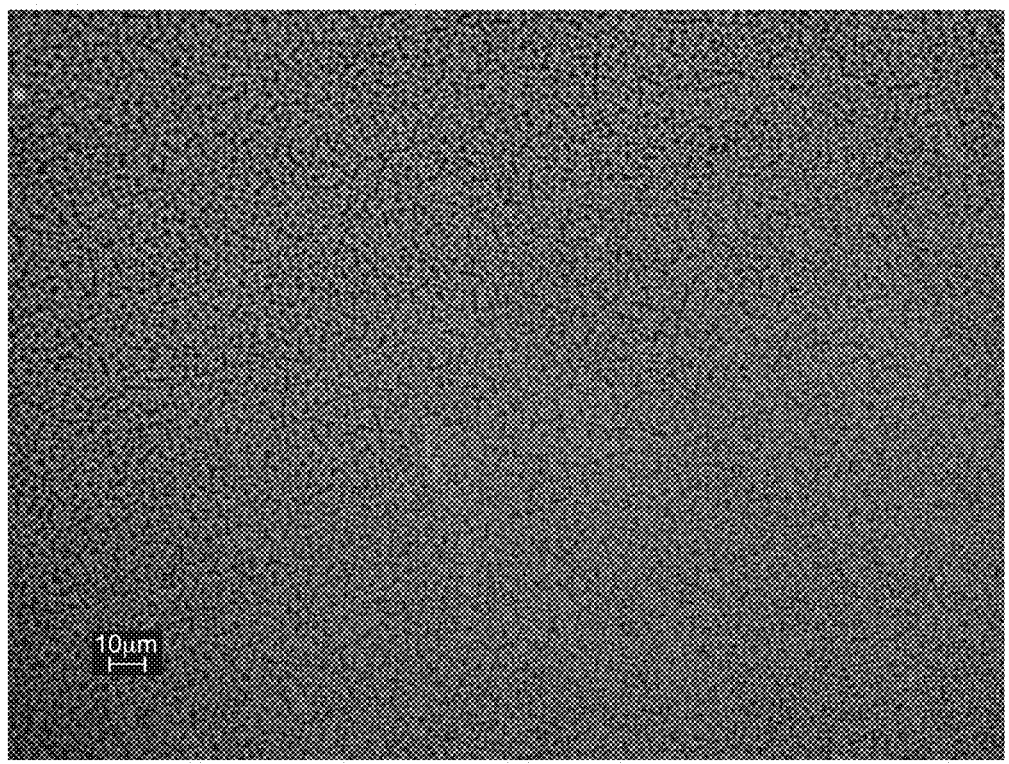
FIG. 5
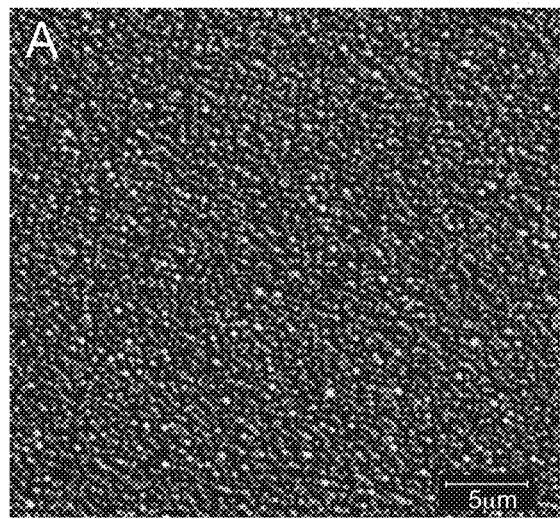 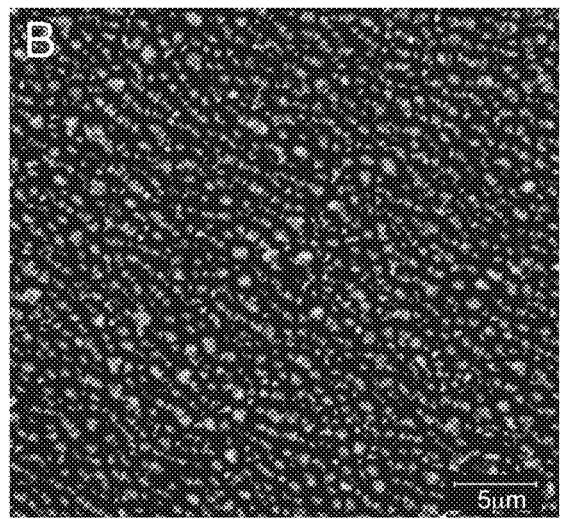
FIG. 6A              FIG. 6B

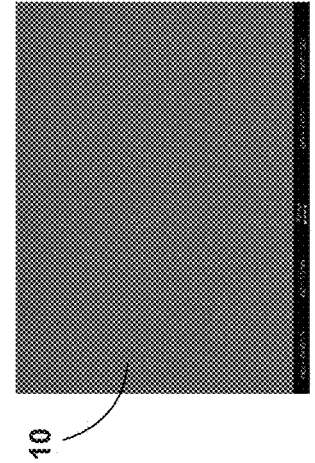
FIG. 8A1
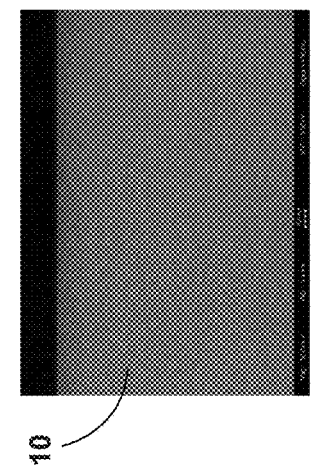
FIG. 8A2
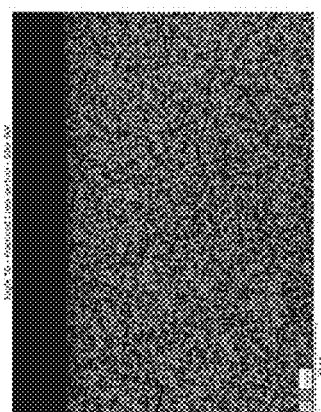
FIG. 8A3
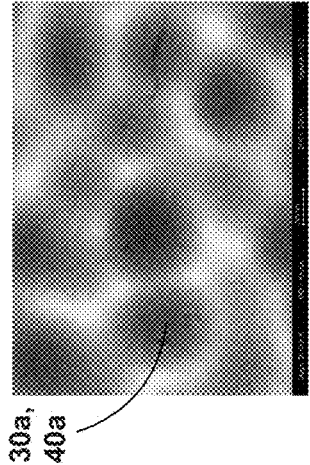
FIG. 8B1
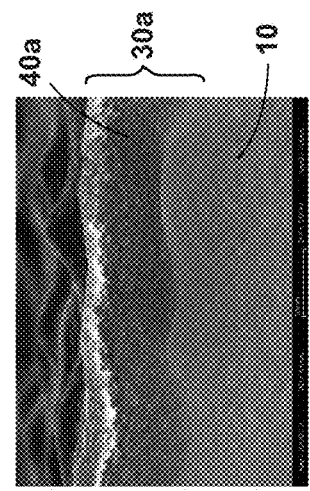
FIG. 8B2
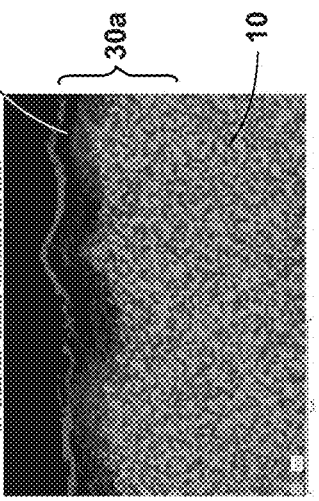
FIG. 8B3
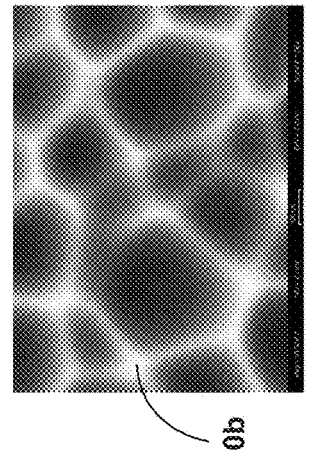
FIG. 8C1
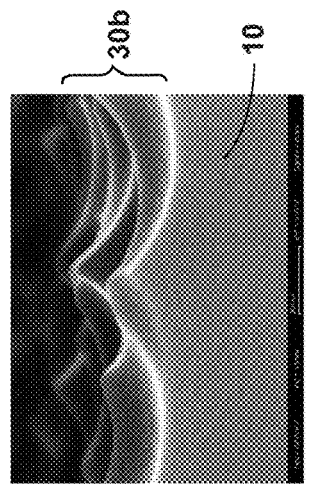
FIG. 8C2
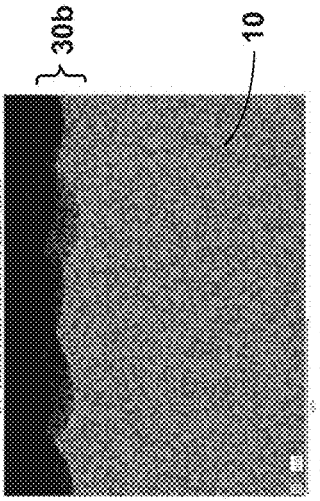
FIG. 8C3

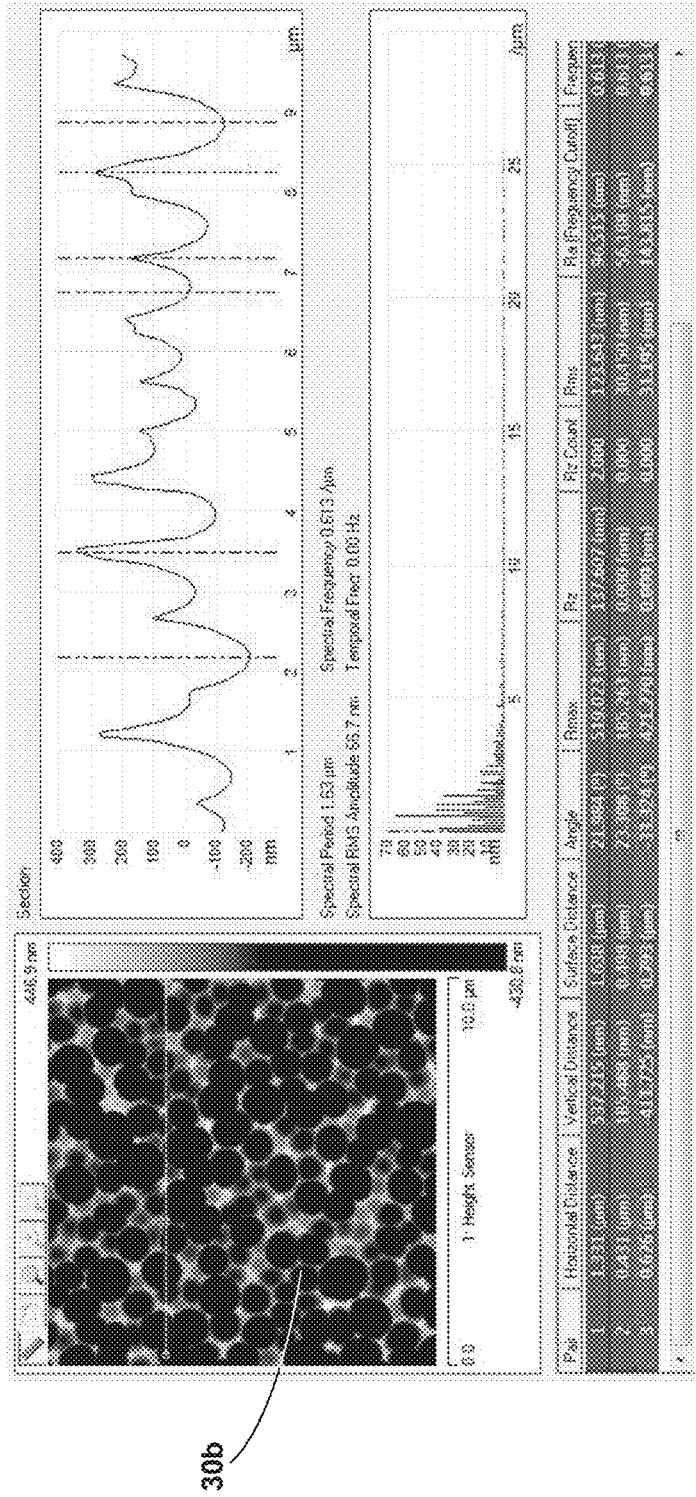
FIG. 9A
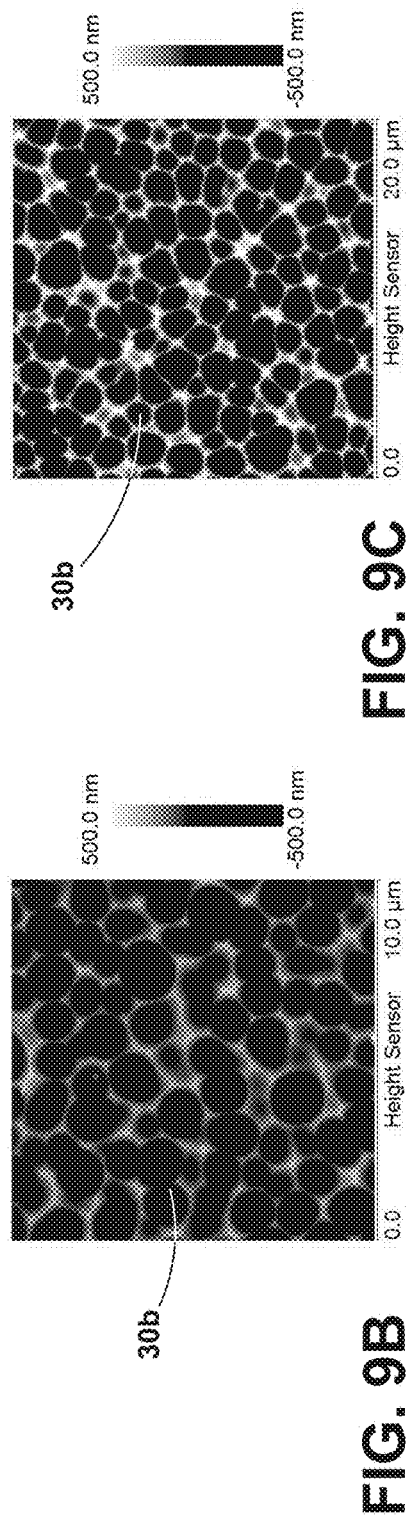
FIG. 9B
FIG. 9C

TEXTURED GLASS ARTICLES AND METHODS OF MAKING THE SAME This application claims the benefit of priority under 35 U.S.C. § 119 of U.S. Provisional Application Ser. No. 62/477,592 filed on Mar. 28, 2017, the content of which is relied upon and incorporated herein by reference in its entirety.

FIELD

The present disclosure generally relates to textured glass articles and methods of making the same, particularly hydrofluoric acid-free methods to produce substantially transparent, low sparkle, textured glass articles.

BACKGROUND

Antiglare surfaces are often used in display devices such as LCD screens, OLEDs and touch screens to avoid or reduce specular reflection of ambient light. In many display devices, these antiglare surfaces are formed by providing a level of roughness to one or more surfaces of the glass to spread and scatter incident light. Antiglare surfaces in the form of a roughened glass surface are often used on the front surfaces of these display devices to reduce the apparent visibility of external reflections from the display and improve readability of the display under differing lighting conditions. These roughened surfaces are also employed in some display device applications, particularly touch screens, to improve tactile feeling.

Display "sparkle" or "dazzle" is a phenomenon that can occur when antiglare or light scattering surfaces are incorporated into a display system. Sparkle is associated with a very fine grainy appearance that can appear to have a shift in the pattern of the grains with changing viewing angle of the display. This type of sparkle is observed when pixelated displays, such as LCDs, are viewed through an antiglare surface. As the resolution of display devices continues to increase, particularly for handheld electronic devices, the pixel pitch of the array of pixels employed in these devices continues to decrease, exacerbating unwanted sparkle effects.

Conventional approaches to making textured glass surfaces suffer from the use of treatments that employ aggressive acids, such as hydrofluoric acid, that are not considered environmentally friendly and costly to employ in manufacturing. Still further, conventional approaches to texturing glass for roughened antiglare surfaces result in relatively large features which can limit the effectiveness of these surfaces in minimizing sparkle. Further, other conventional approaches to creating antiglare surfaces employ additional coatings which can increase manufacturing cost and produce unwanted optical effects.

In view of these considerations, there is a need for textured glass articles with smaller features and methods of making the same, particularly hydrofluoric acid-free methods to produce substantially transparent, low sparkle, textured glass articles. There is also a need for such methods in a form amenable to manufacturing at low cost and high throughput.

SUMMARY

A first aspect of this disclosure pertains to a textured glass article that includes: a glass substrate comprising a thickness, a primary surface and a bulk composition at the midpoint of the thickness; and a textured region defined by the primary surface and comprising a textured region composition. The textured region comprises a sparkle of 2% or less. Further, the bulk composition comprises about 40 mol % to 80 mol % silica and the textured region composition comprises at least about 40 mol % silica.

A second aspect of the disclosure pertains to a textured glass article that includes: a glass substrate comprising a thickness, a primary surface and a bulk composition at the midpoint of the thickness; and a textured region defined by the primary surface and comprising a textured region composition. The textured region comprises a sparkle of 2% or less and a plurality of exposed features having an average maximum dimension of less than 5 microns in a plane defined by the primary surface. Further, the bulk composition comprises about 40 mol % to 80 mol % silica and the textured region composition comprises at least about 40 mol % silica.

In a third aspect according to the first or second aspect, the textured region further comprises a surface roughness ($R_a$) from about 10 nanometers to about 500 nanometers.

In a fourth aspect according to any one of the preceding aspects, the bulk composition is selected from the group consisting of an aluminosilicate glass, a borosilicate glass, and a phosphosilicate glass.

In a fifth aspect according to any one of the preceding aspects, the textured region composition and the bulk composition each comprise a substantially equivalent amount of silica.

In a sixth aspect according to any one of the first through fourth aspects, the textured region composition comprises a higher amount of silica than the silica in the bulk composition.

In a seventh aspect according to any one of the preceding aspects, the glass substrate further comprises a compressive stress region that extends from the primary surface to a selected depth.

In an eighth aspect according to the seventh aspect, the article further comprises an easy-to-clean (ETC) coating disposed over the textured region, the ETC coating comprising a fluorosilane.

In a ninth aspect according to any one of the preceding aspects, the article is characterized by a haze from greater than 0% to 100%.

A tenth aspect of the disclosure pertains to a consumer electronic product including a housing having a front surface, a back surface and side surfaces; electrical components provided at least partially within the housing, the electrical components including at least a controller, a memory, and a display, the display being provided at or adjacent the front surface of the housing; and a cover glass disposed over the display, wherein at least one of a portion of the housing or the cover glass comprises the article of any one of the preceding aspects.

An eleventh aspect of the disclosure pertains to a method of making a textured glass article including the steps: etching an initial primary surface of a glass substrate having a thickness with a hydrofluoric acid-free etchant having a pH of about 3 or less; and removing the etchant from the glass substrate. The etching is conducted from above ambient temperature to about 100° C. to form a textured region that is defined by a primary surface of the substrate and comprises a sparkle of 2% or less. Further, the glass substrate comprises a bulk composition at the midpoint of the thickness comprising about 40 mol % to 80 mol % silica and the textured region comprises a textured region composition comprising at least about 40 mol % silica.

In a twelfth aspect according to the eleventh aspect, the textured region composition comprises a higher amount of silica than the silica in the bulk composition.

In a thirteenth aspect according to the eleventh or twelfth aspect, the method of making a textured glass article further includes the steps: treating the textured region with a second etchant having a pH of about 10.0 or greater to remove the textured region and form a second textured region that comprises a second textured region composition and is defined by a primary surface of the substrate. Further, the treating is conducted above ambient temperature.

In a fourteenth aspect according to any one of the eleventh through thirteenth aspects, the second textured region composition and the bulk composition each comprise a substantially equivalent amount of silica.

In a fifteenth aspect according to the eleventh aspect or the twelfth aspect, the etching step comprises etching the initial primary surface of the glass substrate having a thickness with a hydrofluoric acid-free etchant having a pH of about 3 or less and an additive salt.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which:

FIG. 5 is an optical micrograph of a textured glass article comprising a glass substrate having an alkali-aluminosilicate composition with exposed features of about 1 micron or less from an etching step conducted at 95° C. for 24 hours with 10 wt % HCl, according to an aspect of the disclosure.

FIG. 6A is an optical micrograph of a textured glass article comprising a glass substrate having an aluminosilicate composition with exposed features of about 1 micron or less from an etching step conducted at 95° C. for 24 hours with 5 wt % HCl, according to an aspect of the disclosure.

FIG. 6B is an optical micrograph of a textured glass article comprising a glass substrate having an alkaline earth boro-aluminosilicate composition with exposed features of about 1 micron or less from an etching step conducted at 95° C. for 24 hours with 5 wt % HCl, according to an aspect of the disclosure.

FIGS. 8A1-8A3 are a series of scanning electron microscope (SEM) energy dispersive spectroscopy (EDS) images of an as-prepared silicate glass substrate prior to being subjected to a method of making a textured glass article, according to an aspect of the disclosure.

FIGS. 8B1-8B3 are a series of scanning electron microscope (SEM) energy dispersive spectroscopy (EDS) images of a textured glass article comprising a glass substrate as depicted in FIGS. 8A1-8A3 with a textured region derived from an acid etching step, according to an aspect of the disclosure.

FIGS. 8C1-8C3 are a series of scanning electron microscope (SEM) energy dispersive spectroscopy (EDS) images of a textured glass article comprising a glass substrate as depicted in FIGS. 8A1-8A3 with a textured region derived from a low pH etching step followed by a high pH etching step, according to an aspect of the disclosure.

FIGS. 9A-9C are a series of atomic force microscopy (AFM) images of three respective textured glass articles comprising a glass substrate having an aluminosilicate composition with a textured region having exposed features of about 1 micron or less derived from a low pH etching step followed by a high pH etching step, according to an aspect of the disclosure.

DETAILED DESCRIPTION

Figure 1A:
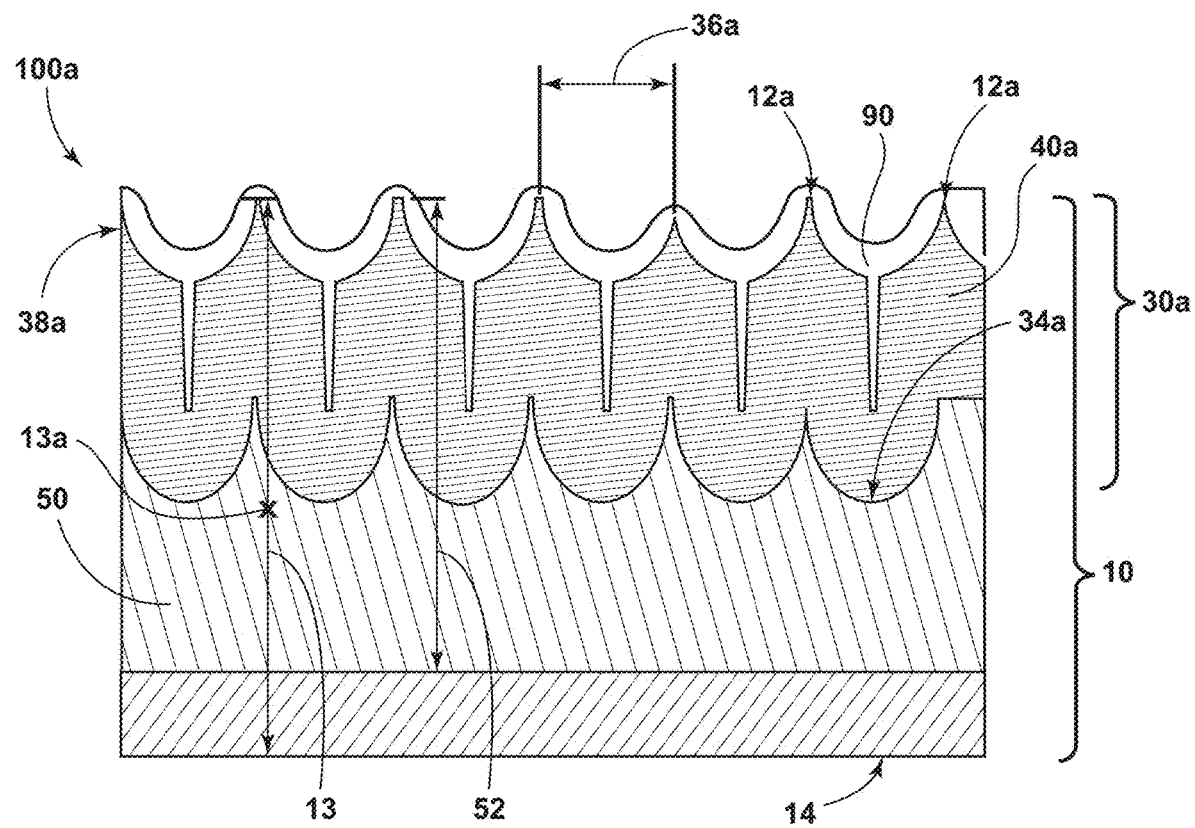
FIG. 1A is a cross-sectional, schematic view of a textured glass article comprising a textured region with a textured region composition comprising a higher amount of silica than the silica in the bulk composition, according to an aspect of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Aspects of the disclosure generally pertain to textured glass articles and, particularly, transparent textured glass articles with low sparkle. Aspects of the disclosure include methods of making these articles, particularly with hydrofluoric acid-free processes. More generally, the approaches to preparing the textured glass articles of the disclosure generate finely textured surfaces with features of less than 5 microns on multi-component glass substrates with compositions that comprise appreciable amounts of silica and one or more additional components. In general, the heterogeneous nature of the glass substrate allows it to be selectively etched with one or more hydrofluoric acid-free etchants, leaving a porous silica-rich layer that can serve as the textured region for the textured glass article. Additional process steps can be employed to remove the porous-silica rich layer, leaving a textured surface with a composition comparable to the bulk composition of the substrate for the textured glass article.

Referring to FIG. 1A, a textured glass article 100a is depicted as including a glass substrate 10 with a plurality of primary surfaces 12a and 14, a thickness 13 and a bulk composition at about the midpoint 13a of the thickness 13. In some embodiments, the bulk composition comprises about 40 mol % to 80 mol % silica. The glass article 100a also includes a textured region 30a with a composition having at least 40 mol % silica. In some embodiments, the textured region 30a is formed from or otherwise part of the substrate 10, as shown in FIG. 1A. In such implementations, the textured region 30a is defined between the primary surface 12a and a textured region interface 34a within the substrate 10. In other implementations (not shown), the textured region 30a is present over the substrate 10, with the interface 34a residing between the textured region 30a and the substrate 10.

As generally depicted in FIG. 1A, the textured region 30a includes a plurality of exposed features on its primary surface 12a with an average feature size 36a and an average roughness 38a. According to some implementations of the textured glass article 100a, the exposed features of the textured region 30a, including their average feature size 36a and average roughness 38a, are configured to reduce the level of glare associated with the article when it is employed in a display device. The average feature size 36a is given by an average of the maximum dimension of a sampling of features associated with the textured region 30a, measured according to analytical techniques as understood by those with ordinary skill in the field of this disclosure, for example, by taking an image of primary surface 12a with an atomic force microscope at 200× magnification and measuring the maximum dimension of a sampling of at least ten (10) features. Accordingly, the terms "average feature size" and "average maximum dimension" are used interchangeably in the disclosure. In some embodiments at least some of the plurality of features have a peak and a valley. The "maximum dimension" of the exposed features is the greatest distance from one portion of a peak of a feature to another portion of the peak of the feature. In embodiments, the average feature size 36a associated with the textured region 30a of the article 100a is less than about 10 microns. According to some implementations, the average feature size 36a associated with the textured region 30a is less than about 5 microns, less than about 1 micron, or less than about 0.5 microns in some cases. Further, the average feature size 36a can be less than about 10 microns, 9 microns, 8 microns, 7 microns, 6 microns, 5 microns, 4 microns, 3 microns, 2 microns, 1 micron, 0.9 microns, 0.8 microns, 0.7 microns, 0.6 microns, 0.5 microns, 0.4 microns, 0.3 microns, 0.2 microns, 0.1 microns, and all values between these upper limits.

Referring again to the textured region 30a associated with the textured glass article 100a depicted in FIG. 1A, the average roughness 38a can be measured as surface roughness, $R_a$, using an interferometer and a sample area of 200 microns by 200 microns. The interferometer used was a ZYGO® NEWVIEW™ 7300 Optical Surface Profiler manufactured by ZYGO® Corporation. The surface roughness is reported as a mean surface roughness. In embodiments, the glass article 100a can employ a textured region 30a having an average roughness 38a from about 10 nanometers to about 500 nanometers ($R_a$). According to some implementations, the average roughness 38a associated with the textured region 30a is from about 10 nanometers to about 500 nanometers ($R_a$), from about 20 nanometers to about 400 nanometers ($R_a$), from about 30 nanometers to about 300 nanometers ($R_a$), and all values between these levels of surface roughness. Further, in some implementations of the textured glass article 100a, the textured region 30a possesses an average roughness 38a from about 0.1 nanometers to about 300 nanometers ($R_a$), and all values between these levels of surface roughness.

When a textured region of a glass article has a relatively low spatial frequency, the roughness associated with its exposed features can begin to act like a plurality of lenses that generates an image artifact called "sparkle". Display "sparkle" or "dazzle" is a generally undesirable side effect that can occur when introducing antiglare or light scattering surfaces into a pixelated display system such as, for example, an LCD, an OLED, touch screens, or the like, and differs in type and origin from the type of "sparkle" or "speckle" that has been observed and characterized in projection or laser systems. Sparkle is associated with a very fine grainy appearance of the display, and may appear to have a shift in the pattern of the grains with changing viewing angle of the display. Display sparkle may be manifested as bright and dark or colored spots at approximately the pixel-level size scale.

As used herein, the terms "pixel power deviation" and "PPD" refer to the quantitative measurement for display sparkle. Further, as used herein, the term "sparkle" is used interchangeably with "pixel power deviation" and "PPD." PPD is calculated by image analysis of display pixels according to the following procedure. A grid box is drawn around each LCD pixel. The total power within each grid box is then calculated from CCD camera data and assigned as the total power for each pixel. The total power for each LCD pixel thus becomes an array of numbers, for which the mean and standard deviation may be calculated. The PPD value is defined as the standard deviation of total power per pixel divided by the mean power per pixel (times 100). The total power collected from each LCD pixel by the eye simulator camera is measured and the standard deviation of total pixel power (PPD) is calculated across the measurement area, which typically comprises about 30×30 LCD pixels.

The details of a measurement system and image processing calculation that are used to obtain PPD values are described in U.S. Pat. No. 9,411,180 entitled "Apparatus and Method for Determining Sparkle," the contents of which that is related to PPD measurements is incorporated by reference herein in its entirety. The PPD measurement system includes: a pixelated source comprising a plurality of pixels, wherein each of the plurality of pixels has referenced indices i and j; and an imaging system optically disposed along an optical path originating from the pixelated source. The imaging system comprises: an imaging device disposed along the optical path and having a pixelated sensitive area comprising a second plurality of pixels, wherein each of the second plurality of pixels are referenced with indices m and n; and a diaphragm disposed on the optical path between the pixelated source and the imaging device, wherein the diaphragm has an adjustable collection angle for an image originating in the pixelated source. The image processing calculation includes: acquiring a pixelated image of the transparent sample, the pixelated image comprising a plurality of pixels; determining boundaries between adjacent pixels in the pixelated image; integrating within the boundaries to obtain an integrated energy for each source pixel in the pixelated image; and calculating a standard deviation of the integrated energy for each source pixel, wherein the standard deviation is the power per pixel dispersion. As used herein, all "PPD" and "sparkle" values, attributes and limits are calculated and evaluated with a test setup employing a display device having a pixel density of 210 pixels per inch (PPI).

As generally depicted in FIG. 1A, the textured region 30a of the textured glass article 100a can be configured to minimize sparkle. In some embodiments, the textured region 30a is configured to minimize sparkle, while maintaining a reduced glare function suitable for display device applications. According to some embodiments, the textured region 30a of the textured glass article 100a is configured such that the article is characterized by a sparkle of 2% or less. In other aspects, the textured glass articles 100a of the disclosure can be configured with a sparkle of 2% or less, 1.5% or less, 1% or less, 0.5% or less, and all sparkle levels between these upper limits.

Referring again to FIG. 1A, the glass substrate 10 of the textured glass article 100a is configured with a multi-component glass composition having about 40 mol % to 80 mol % silica and a balance of one or more other constituents, e.g., alumina, calcium oxide, sodium oxide, boron oxide, etc. In some implementations, the bulk composition of the glass substrate 10 is selected from the group consisting of aluminosilicate glass, a borosilicate glass and a phosphosilicate glass. In other implementations, the bulk composition of the glass substrate 10 is selected from the group consisting of aluminosilicate glass, a borosilicate glass, a phosphosilicate glass, a soda lime glass, an alkali aluminosilicate glass, and an alkali aluminoborosilicate glass. In further implementations, the glass substrate 10 is a glass-based substrate, including but not limited to, glass-ceramic materials that comprise a glass component at about 90% or greater by weight and a ceramic component.

In one embodiment of the textured glass article 100a, the glass substrate 10 has a bulk composition that comprises an alkali aluminosilicate glass that comprises alumina, at least one alkali metal and, in some embodiments, greater than 50 mol %, $SiO_2$, in other embodiments, at least 58 mol %, and in still other embodiments, at least 60 mol % wherein the ratio ($Al_2O_3$ (mol %)+$B_2O_3$ (mol %)) alkali metal modifiers (mol %)>1, where the modifiers are alkali metal oxides. This glass, in particular embodiments, comprises, consists essentially of, or consists of: about 58 mol % to about 72 mol % $SiO_2$; about 9 mol % to about 17 mol $Al_2O_3$; about 2 mol % to about 12 mol % $B_2O_3$; about 8 mol % to about 16 mol % $Na_2O$; and 0 mol % to about 4 mol % KBO, wherein the ratio ($Al_2O_3$ (mol %)+$B_2O_3$ (mol %))/alkali metal modifiers (mol %)>1, where the modifiers are alkali metal oxides.

In another embodiment of the textured glass article 100a, as shown in FIG. 1A, the glass substrate 10 has a bulk composition that comprises an alkali aluminosilicate glass comprising, consisting essentially of, or consisting of: about 61 mol % to about 75 mol % $SiO_2$; about 7 mol % to about 15 mol % $Al_2O_3$; 0 mol % to about 12 mol % $B_2O_3$; about 9 mol % to about 21 mol % $Na_2O$; 0 mol % to about 4 mol % $K_2O$; 0 mol % to about 7 mol % MgO; and 0 mol % to about 3 mol % CaO.

In yet another embodiment, the glass substrate 10 has a bulk composition that comprises an alkali aluminosilicate glass comprising, consisting essentially of, or consisting of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$, 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$, and less than about 50 ppm $Sb_2O_3$; wherein 12 mol %≤$Li_2O+Na_2O+K_2O$≤20 mol % and 0 mol %≤MgO+Ca≤10 mol %.

In still another embodiment, the glass substrate 10 has a bulk composition that comprises an alkali aluminosilicate glass comprising, consisting essentially of, or consisting of: about 64 mol % to about 68 mol % $SiO_2$; about 12 mol % to about 16 mol % $Na_2O$; about 8 mol % to about 12 mol % $Al_2O_3$; 0 mol % to about 3 mol % $B_2O_3$; about 2 mol % to about mol % $K_2O$; about 4 mol % to about 6 mol % MgO; and 0 mol % to about 5 mol % CaO, wherein: 66 mol %≤$SiO_2+B_2O_3+CaO$≤69 mol %; $Na_2O+K_2O+B_2O_3+MgO+CaO+SrO$>10 mol %; 5 mol %≤MgO+CaO+SrO≤8 mol %; $(Na_2O+B_2O_3)-Al_2O_3$≤2 mol %; 2 mol %≤$Na_2O-Al_2O_3$≤6 mol %; and 4 mol %≤$(Na_2O+K_2O)-Al_2O_3$≤10 mol %.

In other embodiments, the glass substrate 10 has a bulk composition that comprises $SiO_2$, $Al_2O_3$, $P_2O_5$, and at least one alkali metal oxide ($R_2O$), wherein 0.75>[($P_2O_5$(mol %)+$R_2O$(mol %))/$M_2O_3$(mol %)]≤1.2, where $M_2O_3$=$Al_2O_3+B_2O_3$. In some embodiments, [($P_2O_5$(mol %)+$R_2O$(mol %))/$M_2O_3$(mol %)]=1 and, in some embodiments, the glass does not include $B_2O_3$ and $M_2O_3$=$Al_2O_3$. The glass substrate comprises, in some embodiments: about 40 to about 70 mol % $SiO_2$; 0 to about 28 mol % $B_2O_3$; about 0 to about 28 mol $Al_2O_3$; about 1 to about 14 mol % $P_2O_5$; and about 12 to about 16 mol % $R_2O$. In some embodiments, the glass substrate comprises: about 40 to about 64 mol % $SiO_2$; 0 to about 8 mol % $B_2O_3$, about 16 to about 28 mol % $Al_2O_3$; about 2 to about 12 mol % $P_2O_5$; and about 12 to about 16 mol % $R_2O$. The glass substrate 10 may further comprise at least one alkaline earth metal oxide such as, but not limited to, MgO or CaO.

In some embodiments, the glass substrate 10 has a bulk composition that is substantially free of lithium; i.e. the glass comprises less than 1 mol % $Li_2O$ and, in other embodiments, less than 0.1 mol % and, in other embodiments, 0.01 mol % $Li_2O$, and in still other embodiments, 0 mol % $Li_2O$. In some embodiments, such glasses are free of at least one of arsenic, antimony, and barium; i.e. the glass comprises less than 1 mol % and, in other embodiments, less than 0.1 mol %, and in still other embodiments 0 mol % of $As_2O_3$, $Sb_2O_3$, and/or BaO.

In other embodiments of the textured glass article 100a, the glass substrate 10 has a bulk composition that comprises, consists essentially of or consists of a glass composition Corning® Eagle XG® glass, Corning® Gorilla® glass, Corning® Gorilla® Glass 2, Corning® Gorilla® Glass 3, Corning® Gorilla® Glass 4 or Corning® Gorilla® Glass 5.

As also depicted in FIG. 1A, the textured region 30a of the textured glass article 100a can be defined by a porous leached layer 40a that ranges between the primary surface 12a and the textured region interface 34a of the glass substrate 10. In some embodiments, the porous leached layer 40a comprises a higher amount of silica than the silica content in the bulk composition of the glass substrate 10. As an example for purposes of illustration, a textured glass article 100a with a glass substrate 10 possessing a bulk composition comprising about 50 mol % silica may include a textured region 30a with a porous leached layer 40a possessing about 70 mol % silica. As will be outlined in greater detail below, the porous leached layer 40a can be created through a low pH treatment of the glass substrate 10. Such a treatment can preferentially remove non-silica components of the substrate 10, thus leaving a porous leached layer 40a with a higher silica content than the bulk composition of the substrate 10.

Figure 1B:
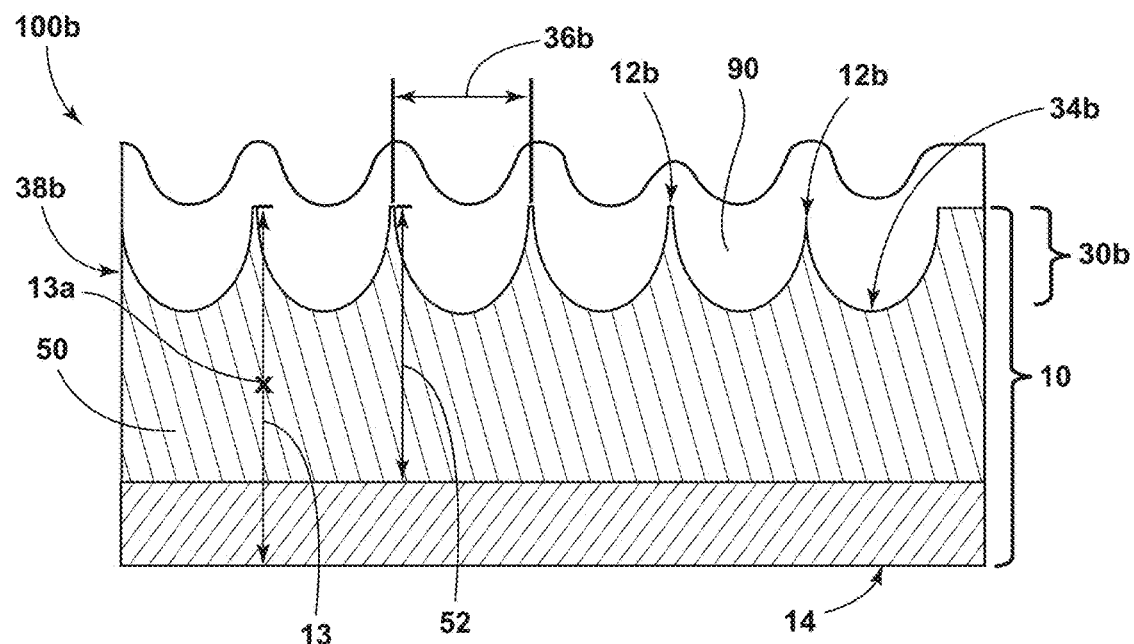
FIG. 1B is a cross-sectional, schematic view of a textured glass article comprising a textured region with a textured region composition comprising a substantially equivalent amount of silica as contained in the bulk composition, according to an aspect of the disclosure.

Referring now to FIG. 1B, a textured glass article 100b is depicted as including a glass substrate 10 with a plurality of primary surfaces 12b and 14, a thickness 13 and a bulk composition at the midpoint 13a of the thickness 13. In some embodiments, the bulk composition comprises about 40 mol % to 80 mol % silica. It should be understood that the textured glass article 100b is substantially similar to the textured glass article 100a with regard to function and attributes. Further, unless otherwise noted, like-numbered elements associated with textured glass article 100b depicted in FIG. 1B have the same or equivalent structure and function as the same elements associated with the textured glass article 100a depicted in FIG. 1A and outlined earlier. The primary difference between textured glass articles 100a and 100b is that the textured region 30a of the textured glass article 100a can include a porous leached layer 40a, as shown in FIG. 1A, and the textured region 30b of the textured glass article 100b is not characterized with a porous leached layer comparable to the layer 40a.

Turning back to FIG. 1B, the textured glass article 100b includes a textured region 30b with a composition having at least 40 mol % silica. The textured region 30b is defined by the primary surface 12b and the textured region interface 34b of the glass substrate 10. As depicted in exemplary fashion in FIG. 1B, the textured region interface 34b of the textured region 30b is substantially coincident with the primary surface 12b of the glass substrate 10, as indicative of a textured region 30b having little to no depth within the substrate 10. In other aspects, the primary surface 12b of the substrate 10 resides above the textured region interface 34b, as indicative of a textured region 30b having a depth within the substrate 10, e.g., as defined from the primary surface 12b to a depth given by the textured region interface 34b (not shown).

As generally depicted in FIG. 1B, the textured region 30b includes a plurality of exposed features on its primary surface 12b with an average feature size 36b and an average roughness 38b. According to some implementations of the textured glass article 100b, the exposed features of the textured region 30b, including their average feature size 36b and average roughness 38b, are configured to reduce the level of glare associated with the article when it is employed in a display device. The average feature size 36b is given by an average of the maximum dimension of a sampling of features associated with the textured region 30b, measured according to analytical techniques as understood by those with ordinary skill in the field of this disclosure, for example, by taking a photomicrograph of primary surface 12a at 200× magnification and measuring the maximum dimension of a sampling of at least ten (10) features. In embodiments, the average feature size 36b associated with the textured region 30b of the article 100b is less than about 10 microns. According to some implementations, the average feature size 36b associated with the textured region 30b is less than about 5 microns, less than about 1 micron, or less than about 0.5 microns in some cases. Further, the average feature size 36b can be less than about 10 microns, 9 microns, 8 microns, 7 microns, 6 microns, 5 microns, 4 microns, 3 microns, 2 microns, 1 micron, 0.9 microns, 0.8 microns, 0.7 microns, 0.6 microns, 0.5 microns, 0.4 microns, 0.3 microns, 0.2 microns, 0.1 microns, and all values between these upper limits.

Referring again to the textured region 30b associated with the textured glass article 100b depicted in FIG. 1B, the average roughness 38b can be measured as surface roughness, $R_a$, using the technique described above with reference to FIG. 1A. In embodiments, the glass article 100b can employ a textured region 30b having an average roughness 38b from about 10 nanometers to about 500 nanometers ($R_a$). According to some implementations, the average roughness 38b associated with the textured region 30b is from about 10 nanometers to about 500 nanometers ($R_a$), from about 20 nanometers to about 400 nanometers ($R_a$), from about 30 nanometers to about 300 nanometers ($R_a$), and all values between these levels of surface roughness. Further, in some implementations of the textured glass article 100b, the textured region 30b possesses an average roughness 38b from about 0.1 nanometers to about 300 nanometers ($R_a$), and all values between these levels of surface roughness.

According to some embodiments of the textured glass article 100b depicted in FIG. 1B, the textured region 30b can be characterized such that its composition is substantially equivalent to the bulk composition of the glass substrate 10, particularly with regard to silica content. As will be outlined in greater detail below, the textured region 30b can be created through successive low pH and high pH treatments to the glass substrate 10. The low pH treatment can preferentially remove non-silica components of the substrate 10, leaving a porous leached layer 40a (e.g., as shown in FIG. 1A) with a higher silica content than the bulk composition of the substrate 10. The subsequent high pH treatment, however, can be configured to remove the porous leached layer, leaving a textured region 30b having about the same composition as the bulk composition of the glass substrate 10, particularly with regard to silica content.

As used herein, the terms "transmission haze" and "haze" refer to the percentage of transmitted light scattered outside an angular cone of about ±2.5° in accordance with ASTM procedure D1003, entitled "Standard Test Method for Haze and Luminous Transmittance of Transparent Plastics," the contents of which is incorporated by reference herein in its entirety. For an optically smooth surface, transmission haze is generally close to zero. According to implementations of the textured glass articles 100a, 100b (see FIGS. 1A & 1B), the articles can be characterized by a haze of 25% or less. In other implementations, for particular applications, textured glass articles 100a, 100b consistent with the principles of this disclosure can be fabricated with haze levels as high as 100%, haze levels ranging from 0% to 100%, haze levels from 0% to 50%, and all haze levels between these values. For example, desired haze levels in the textured glass articles 100a, 100b can be obtained by controlling the etching conditions associated with producing the respective textured regions 30a, 30b. In general, higher acid concentrations and/or etching times can increase the amount of haze associated with a particular textured glass article 100a, 100b.

According to other embodiments, the glass substrate 10 of the textured glass articles 100a, 100b (see FIGS. 1A & 1B) can possess an ion-exchangeable glass composition that is strengthened by either chemical or thermal means that are known in the art. In one embodiment, the glass substrate is chemically strengthened by ion exchange. In this process, metal ions at or near a primary surface 12a, 12b of the glass substrate 10 (see FIGS. 1A & 1B) are exchanged for larger metal ions having the same valence as the metal ions in the glass substrate. The exchange is generally carried out by contacting the glass substrate 10 with an ion exchange medium such as, for example, a molten salt bath that contains the larger metal ion. The metal ions are typically monovalent metal ions such as, for example, alkali metal ions. In one non-limiting example, chemical strengthening of a glass substrate 10 that contains sodium ions by ion exchange is accomplished by immersing the glass substrate 10 in an ion exchange bath comprising a molten potassium salt such as potassium nitrate ($KNO_3$) or the like. In one particular embodiment, the ions in the surface layer of the glass substrate 10 and the larger ions are monovalent alkali metal cations, such as $Li^+$ (when present in the glass), $Na^+$, $K^+$, $Rb^+$, and $Cs^+$. Alternatively, monovalent cations in the surface layer of the glass substrate 10 may be replaced with monovalent cations other than alkali metal cations, such as $Ag^+$ or the like.

In these embodiments, the replacement of small metal ions by larger metal ions in the ion exchange process creates a compressive stress region 50 in the glass substrate 10 that extends from the primary surface 12a, 12b to a depth 52 (see FIGS. 1A & 1B) (referred to as the "depth of layer") that is under compressive stress. This compressive stress at the primary surface of the glass substrate is balanced by a tensile stress (also referred to as "central tension") within the interior of the glass substrate. In some embodiments, the primary surface 12a or 12b of the glass substrate 10 described herein, when strengthened by ion exchange, has a compressive stress of at least 350 MPa, and the region under compressive stress extends to a depth 52, i.e., depth of layer, of at least 15 μm below the primary surface 12a or 12b.

Ion exchange processes are typically carried out by immersing the glass substrate 10 in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass as a result of the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 16 hours. However, temperatures and immersion times different from those described above may also be used. Such ion exchange treatments, when employed with a glass substrate 10 having an alkali aluminosilicate glass composition, result in a compressive stress region 50 having a depth 52 (depth of layer) ranging from about 10 μm up to at least 50 μm with a compressive stress ranging from about 200 MPa up to about 800 Pa, and a central tension of less than about 100 MPa.

As the etching and leaching processes that can be employed to create the textured regions 30a, 30b, according to some embodiments, can, in some instances, remove alkali metal ions from the glass substrate 10 that would otherwise be replaced by a larger alkali metal ion during an ion exchange process, a preference exists for developing a compressive stress region 50 in the textured glass article 100a, 100b after the formation and development of the textured region 30a, 30b. In other embodiments, a compressive stress region 50 can be developed in the glass substrate 10 prior to development of the textured region 30a, 30b to a depth 52 sufficient to account for some loss in the depth of layer in the region 50 associated with the low pH, or low and high pH treatments, as outlined below.

According to another implementation of the textured glass articles 100a, 100b depicted in FIGS. 1A and 1B, the article further includes an easy-to-clean (ETC) coating 90 disposed over the textured region 30a, 30b. In most embodiments, the ETC coating 90 is deposited over the textured region 30a, 30b such that its surface morphology generally mirrors the underlying morphology of the textured region 30a, 30b. In one embodiment, the textured glass article 100a, 100b further includes a smudge-resistant fluorine-based ETC coating 90, deposited on at least a portion of the textured region 30a, 30b. In embodiments, the ETC coating 90 comprises at least one amphiphobic substance having fluorine termination groups provide the textured region 30a, 30b with amphiphobicity (i.e., hydrophobicity and oleophobicity, or lack of affinity for both oils and water), thus minimizing wetting of the surface by water and/or oils. The fluorine termination groups of the ETC coating 90 are less polar than a surface having —OH termination groups, and therefore minimize hydrogen (i.e., Van der Waals) bonding between particles and liquids. For fingerprint oils and debris associated with fingerprints, bonding—and adhesion—is minimized. Consequently, mass transport of fingerprint oils and debris from the finger of a person to the ETC coating 90 is minimized. In one embodiment, the ETC coating 90 is formed by exchanging the hydrogen found in terminal OH groups on the textured region 30a, 30b of the textured glass article 100a, 100b with a fluorine-based moiety such as, for example, a fluorine-containing monomer (e.g., a fluorosilane), to form a glass having terminal fluorinated groups.

In another embodiment, the ETC coating 90 of the textured glass articles 100a, 100b comprises a self-assembled monolayer of a fluorine-terminating molecular chain. In yet another embodiment, the ETC coating 90 comprises a thin, fluoro-polymeric coating and, in yet another embodiment, the ETC coating comprises silica soot particles that have been treated to have pendent fluorocarbon groups attached to the soot particles. Such ETC coatings 90 can be applied to the textured region 30a, 30b of the textured glass article 100a, 100b by dipping, vapor coating, spraying, application with a roller, or other suitable method known in the art. After the ETC coating 90 has been applied, it may be "cured" at temperatures ranging from about 25° C. up to about 150° C. and, in another embodiment, at temperatures ranging from about 40° C. up to about 100° C. Curing times can range from about 1 up to about 4 hours, and may be carried out in an atmosphere containing 40-95% moisture. After curing, the textured glass articles 100a, 100b with an ETC coating 90 can be solvent rinsed to remove any unbound coating and air-dried prior to use.

Figure 2:
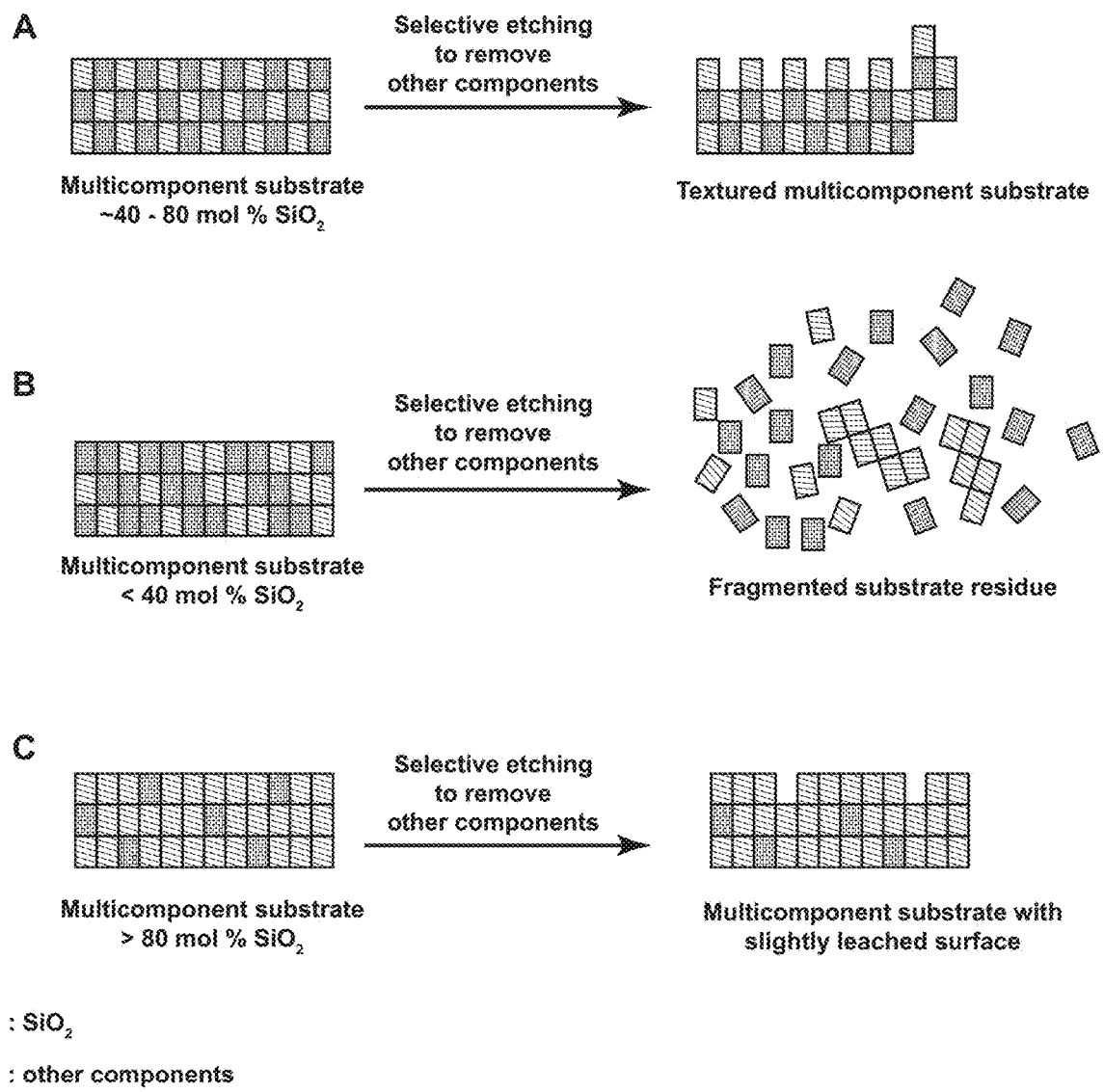
FIG. 2 is a schematic chart depicting the effects of leaching a silica-containing, multicomponent glass substrate with varying levels of silica.

Referring now to FIG. 2, a schematic chart depicts the effects of employing a low pH leaching process according to the disclosure to a silica-containing, multicomponent glass substrate (e.g., a glass substrate comparable to glass substrate 10) with varying levels of silica. In portion "A" of FIG. 2, a glass substrate with a composition having about 40 mol % to about 80 mol % silica is subjected to a low pH leaching process and non-silica components (denoted as "other components" in FIG. 2) are removed. The net result is a textured glass article (e.g., as comparable to a textured glass article 100a depicted in FIG. 1A) with a textured region having a higher silica content than the bulk composition of the substrate. In contrast, the portions "B" and "C" in FIG. 2 represent the effects of conducting the same low pH process with glass substrate compositions outside the preferred window in terms of silica content. That is, the substrate in portion "B" has a silica content of less than 40 mol %, and this substrate essentially falls apart or significantly degrades from the removal of the non-silica components during the low pH treatment. On the other hand, the substrate in portion "C" has a silica content of greater than 80 mol %, and the surface of this substrate is nearly indistinguishable from the surface of the substrate prior to etching; consequently, the substrate in portion "C" does not possess a textured region consistent with the principles of the disclosure after being subjected to the low pH treatment.

Figure 3A:
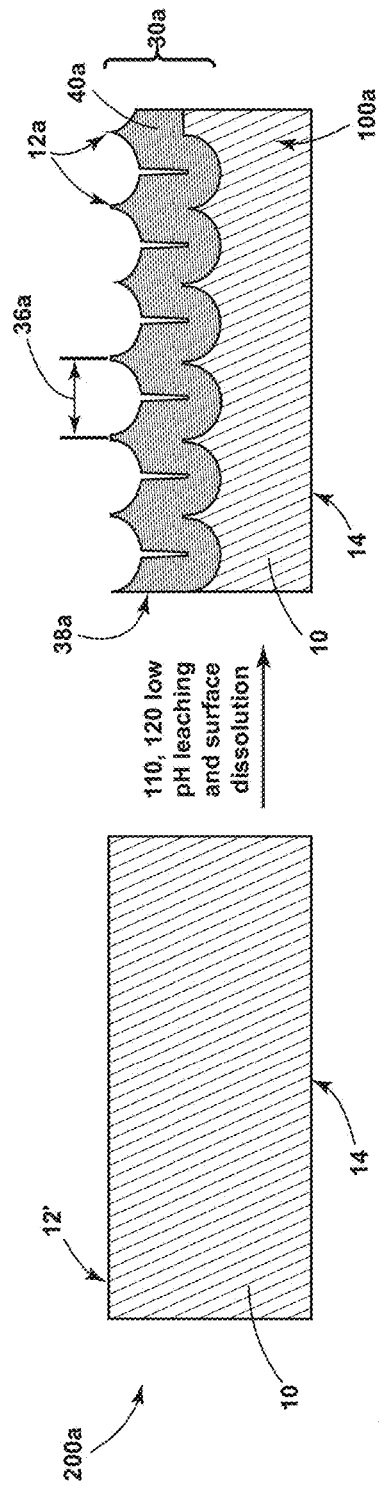
FIG. 3A is a schematic, flow chart depicting a method of making a textured glass article as depicted in FIG. 1A, according to an aspect of the disclosure.

Referring now to FIG. 3A, a schematic, flow chart is provided that depicts a method 200a of making a textured glass article, e.g., a textured glass article 100a (as depicted in FIG. 1A). As shown, a glass substrate 10 is provided with an initial primary surface 12', along with an opposing primary surface 14. An etching step 110, 120 is then conducted to the substrate 10 that includes etching the initial primary surface 12' with a hydrofluoric acid-free etchant having a pH of about 3 or less. With further regard to the etching step 110, 120, it includes a metal ion leaching portion 110 (e.g., alkali metals from the substrate 10) and a surface dissolution portion (e.g., silica from the substrate 10). In some embodiments of the method 200a, hydrochloric acid and/or citric acid can be employed as the hydrofluoric acid-free etchant during step 110, 120. According to an embodiment, etching step 110, 120 is conducted at an elevated temperature from above ambient temperature to about 100° C. In some implementations, the etching step 110, 120 is conducted at about 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., and all temperatures between these values. Further, the etching step 110, 120 can be conducted from about 15 minutes to about 100 hours. In some embodiments, the etching step 110, 120 is conducted from about 5 hours to about 30 hours. Suitable concentration levels for hydrochloric acid etchants, according to some implementations, range from about 0.5% to about 15% by weight, e.g., about 0.5%, 1%, 2%, 3%, 4%, 5%, 6%, 7%, 8%, 9%, 10%, 11%, 12%, 13%, 14%, 15%, and all concentrations of hydrochloric acid between these levels. Suitable concentration levels for citric acid etchants, according to other implementations, range from about 1% to 30% by weight, e.g., about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, and all concentrations of citric acid between these levels. Upon completion of the etching step 110, 120, a textured region 30a is formed in the textured glass article 100a (see also FIG. 1A).

According to another embodiment of the method 200a of making a textured article shown in FIG. 3A (e.g., a textured glass article 100a (as depicted in FIG. 1A)), the etching step 110, 120 can include etching the initial primary surface 12' of the glass substrate 10 having a thickness 13 (as shown in FIG. 1A) with a hydrofluoric acid-free etchant having a pH of about 3 or less and an additive salt. As used herein, the term "additive salt" comprises a salt comprising one or more of a multivalent metal cation (e.g., $Al^{3+}$), an ammonium cation (e.g., $NH_4^+$) and a metal cation not present or at a trace abundance in the glass substrate 10 (e.g., $Li^+$ for certain compositions of glass substrate 10). In some embodiments, the additive salt can comprise a multivalent metal ion and/or an ammonium ion, e.g., as selected from the group consisting of $NH_4^+$, $Al^{3+}$, $Fe^{3+}$, $Ca^{2+}$ and $Mg^{2+}$. For example, the additive salt can be $NH_4Cl$, $AlCl_3$, $FeCl_3$, $CaCl_2$ and $MgCl_2$. In some embodiments, the additive salt can also include salts comprising a cation not present or in a trace abundance within the target glass substrate 10, e.g., $NH_4Cl$, LiCl, CsCl, etc. According to some embodiments, the etching step 110, 120 is conducted such that the additive salt (in addition to the hydrochloric acid-free etchant) is employed at a concentration from greater than about 0.1M to about 5M. According to some embodiments, the multivalent metal salt is employed in the etching step 110, 120 at a concentration from greater than about 0.1M to about 3M, from about 0.5M to about 2M, from about 0.5M to about 1.5M, and all concentration values between these range endpoints. In some implementations of the etching step 110, 120 employing an additive salt, the etching is conducted at a temperature from about 75° C. to about 110° C., from about 80° C. to about 110° C., from about 85° C. to about 110° C., from about 90° C. to about 110° C., and all temperatures between these range endpoints. Advantageously, the incorporation of the additive salt into the etching step 110, 120 can reduce the etching time needed to develop the desired level of haze and the textured region 30a (see also FIG. 1A). According to some implementations of the etching step 110, 120 employing an additive salt, the etching can be conducted from about 15 minutes to about 10 hours. In preferred implementations, the etching step 110, 120 can be conducted with an additive salt from about 15 minutes to about 5 hours, from about 30 minutes to about 5 hours, or even from about 30 minutes to 2 hours.

Referring again to FIG. 3A, in some embodiments, the method 200a further includes a removing step configured to remove excess etchant and leached substrate constituents from the etching step 110, 120. That is, after step 110, 120 of the method 200a, excess etchant, along with any constituents from the initial primary surface 12' of the substrate 10, are then removed by rinsing the etchant on the initial primary surface 12' with deionized water. As would be understood by those with ordinary skill in the field of the disclosure, various mechanical and/or aqueous cleaning approaches can be employed in the removing step to remove excess etchant and leached substrate constituents without materially affecting the surface of the substrate 10.

Figure 3B:
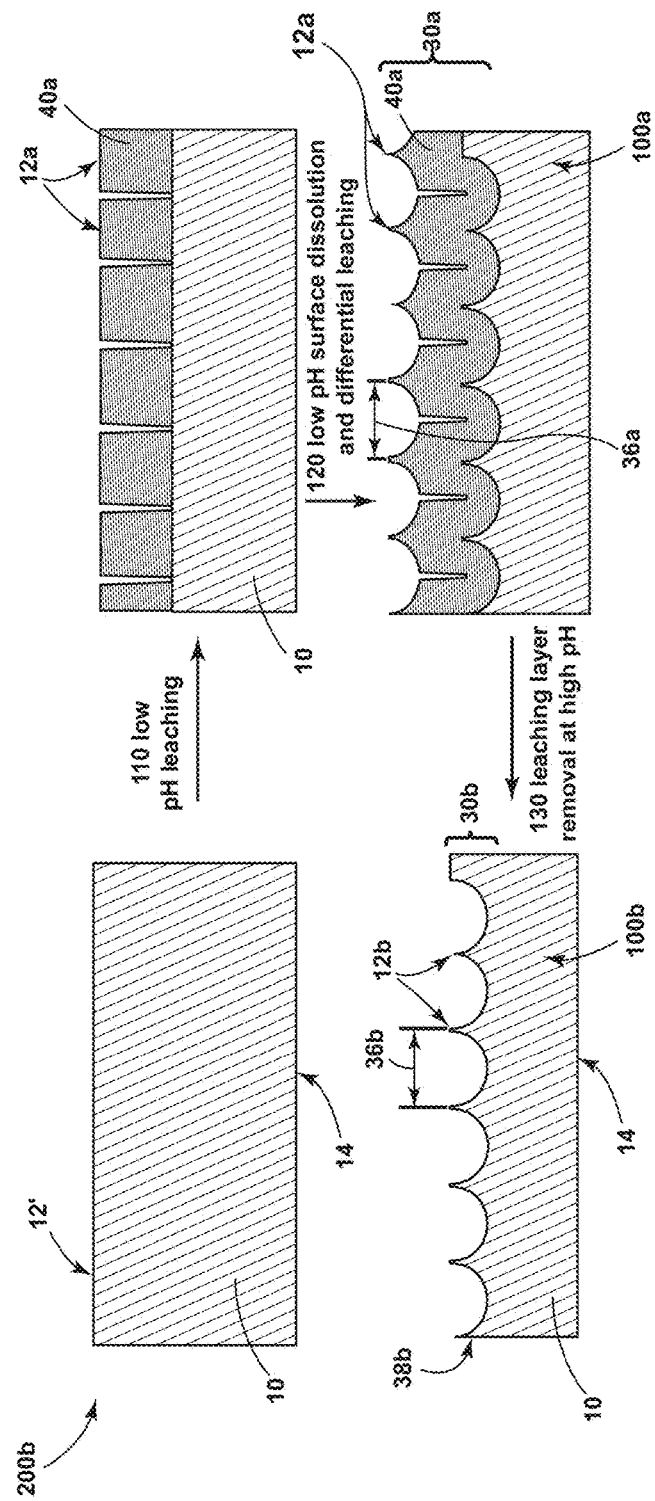
FIG. 3B is a schematic, flow chart depicting a method of making a textured glass article as depicted in FIG. 1B, according to an aspect of the disclosure.

In embodiments, the etching step of the method 200a shown in FIG. 3A is associated with a low pH leaching portion 110, and a low pH surface dissolution and differential leaching portion 120 (see also FIG. 3B). Without being bound by theory, the low pH leaching portion 110 occurs during an initial period during the etching and results in leaching of non-silica constituents from the substrate 10. According to some embodiments, the low pH leaching portion 110 can be represented by the following reaction ("Reaction 1"): $M^{x+}$ (in glass substrate)→$M^{x+}$ (etchant), where M represents metal ions leaching from the glass substrate 10 into the etchant, and x equals an integer. As crevices and other high depth features are created in the initial primary surface 12' of the glass substrate 10 during the low pH leaching portion 110, preferential removal of additional non-silica constituents occurs to the glass substrate in these crevice regions (e.g., at a higher leaching rate than surrounding material) during the differential leaching portion 120, leading to the additional development of features below the leached layer 40a. According to some embodiments, the differential leaching portion 120 can be represented by the following reaction ("Reaction 2"), which describes silica layer dissolution at the surface of the glass substrate 10: $(SiO_2)n$ (in glass substrate)+$2n\ H_2O$→$n\ H_4SiO_4$ (i.e., silicic acid formed within the etchant), where n is an integer. It is also believed that the foregoing reaction can proceed in reverse, with silicic acid precipitating out as $SiO_2$ within the etchant ("Reaction 3"). As the concentration of silicic acid is reduced in Reaction 3, Reactions 1 and 2 are not rate-limited and can continue, facilitating the etching process to obtain the textured region 30a. As such, the textured region 30a formed during the etching step 110, 120 can have multiple morphologies, e.g., at the primary surface 12a and at the interface 34a between the leached layer 40a and the underlying substrate 10 (see FIG. 1A).

Without being bound by theory, the rate of formation of the textured region 30a according to the method 200a can be accelerated or decelerated by controlling aspects of the foregoing Reactions 1, 2 and/or 3. For example, a reduction in the amount of water employed in the etchant can slow Reaction 2 (e.g., by adding a water-soluble organic solvent) and, accordingly, the rate at which method 200a proceeds. Similarly, adding silicic acid to the etchant can also slow Reaction 2 which, in turn, will slow the rate at which method 200a proceeds. According to some embodiments of the method 200a, as noted above, the etching step 110, 120 can also employ an additive salt. In particular, the additive salt can serve as a catalyst in Reaction 3. That is, the additive salt (inclusive of $NH_4Cl$) will accelerate Reaction 3 such that the silicic acid precipitates, re-nucleates and/or polymerizes in the etchant, thus reducing the concentration of silicic acid in the etchant. As a consequence, the reduction in silicic acid in the etchant should allow for the acceleration of Reaction 1, thus accelerating the overall rate of formation of the textured region 30a according to the method 200a. According to another implementation, each of the Reactions 1, 2 and 3 can be accelerated by increasing the reaction temperature, up to about 100° C. Finally, it is also possible to slow Reaction 1 by incorporating metal ions of the glass substrate 10 into the etchant (e.g., $Li^+$, $Na^+$, and $K^+$).

As shown in FIG. 3B, a schematic, flow chart is provided that depicts a method 200b of making a textured glass article, e.g., a textured glass article 100b (as depicted in FIG. 1B). The etching step 110, 120 of the method 200b is the same as employed in the method 200a depicted in FIG. 3A. Further, embodiments of the method 200b can include a removing step conducted after the etching step 110, 120 to remove excess etchant and leached substrate constituents from the etching step 110, 120. More particularly, the completion of the etching step 110, 120 in the method 200b results in an interim textured glass article having a textured region 30a and a leached layer 40a (e.g., as comparable to the textured glass article 100a shown in FIGS. 1A and 3A). At this point, the method 200b continues with a treating step 130 conducted by treating the textured region 30a with an etchant having a pH of about 10.0 or greater to form a textured region 30b. In embodiments, the etchant employed during the step 130 is an aqueous, alkaline solution having a pH that ranges from about 10 to about 13. In particular, the leached layer 40a is removed during the treating step 130, leaving the textured region 30a, which is defined by the primary surface 12b of the substrate 10. In embodiments of the method 200b, the primary surface 12b is initially formed during the differential leaching portion 120 of the etching step 110, 120 and later 'revealed' by the removal of the leached layer 40a during the treating step 130. In some embodiments of the method 200b, the composition of the textured region 30b is substantially equivalent to the bulk composition of the glass substrate 10, particularly with regard to silica.

Figure 4A:
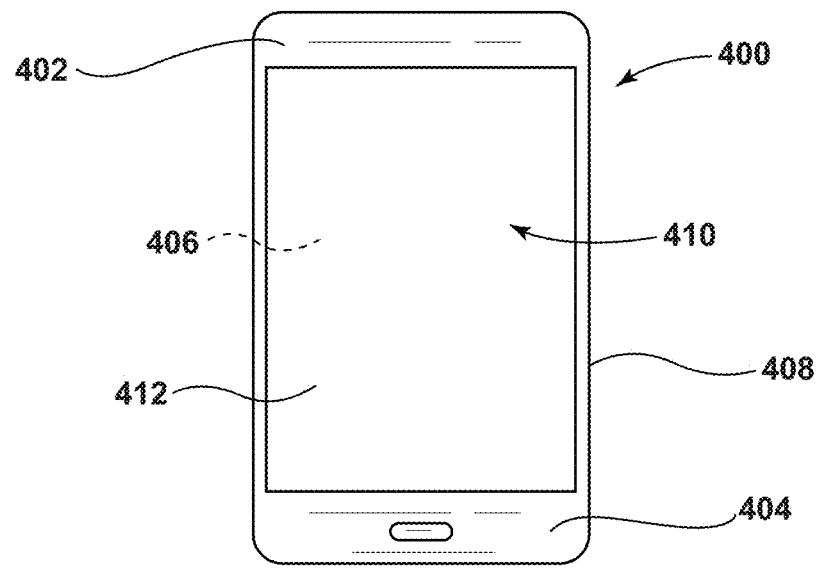
FIG. 4A is a plan view of an exemplary electronic device incorporating any of the articles disclosed herein.
Figure 4B:
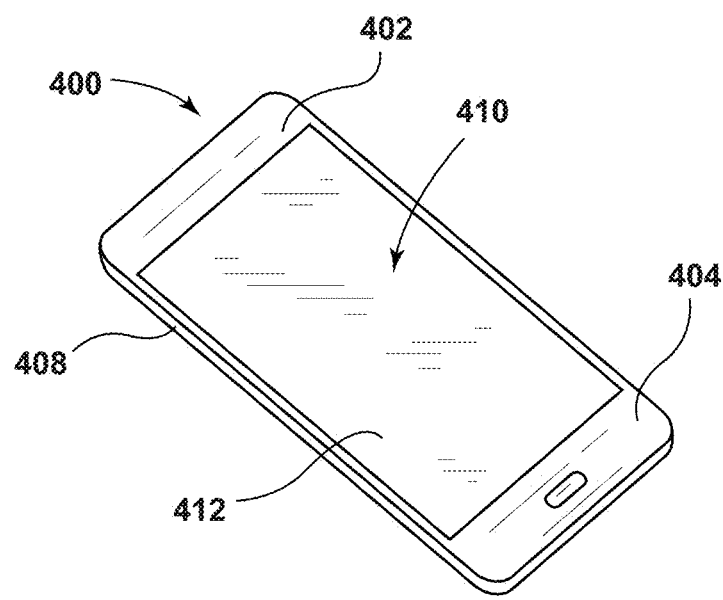
FIG. 4B is a perspective view of the exemplary electronic device of FIG. 4A.
Figure 7A:
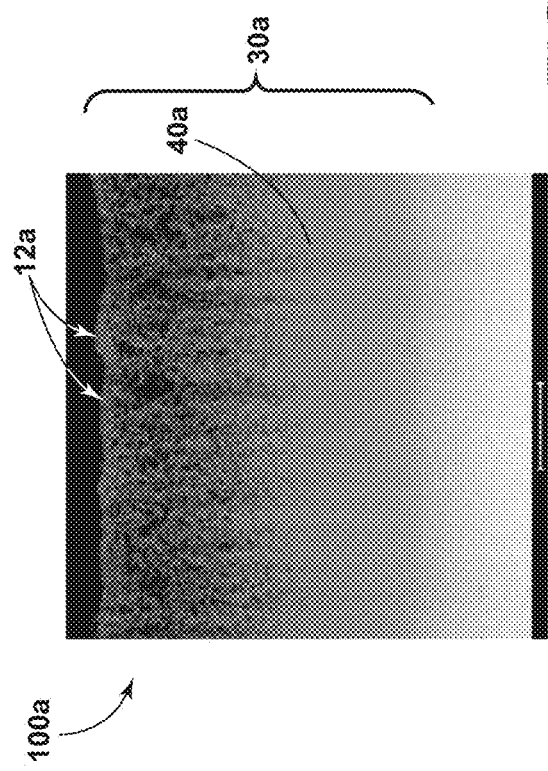
FIGS. 7A-7D are scanning transmission electron microscopy (STEM) images of a cross-section of a textured glass article comprising a glass substrate having an alkali-aluminosilicate composition with a porous leaching layer derived from an etching step conducted at 95° C. for 8 hours with 9 wt % HCl, according to an aspect of the disclosure.
Figure 7B:
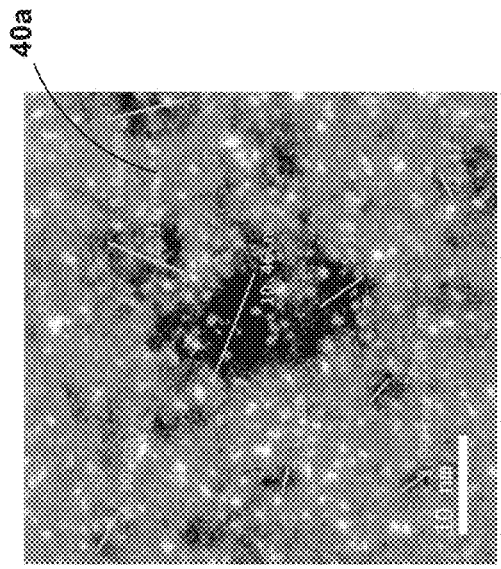
Figure 7C:
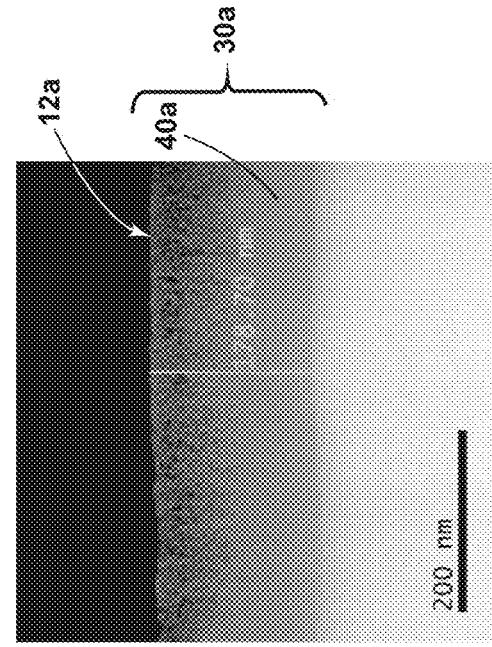
Figure 7D:
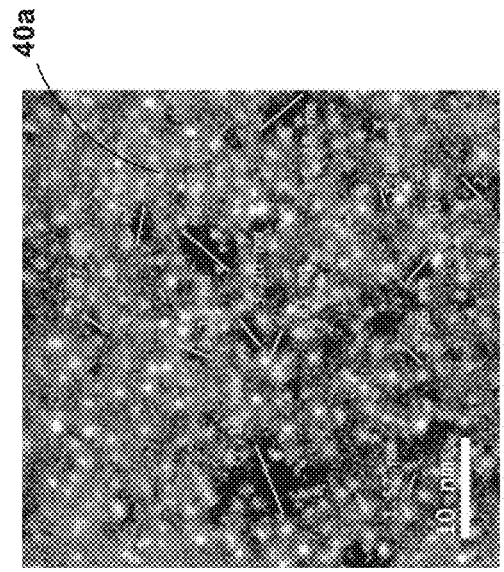

The glass articles disclosed herein, e.g., glass articles 100a, 100b, may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass articles disclosed herein, including glass articles 100a, 100b, is shown in FIGS. 4A and 4B. Specifically, FIGS. 4A and 4B show a consumer electronic device 400 including a housing 402 having front 404, back 406, and side surfaces 408; electrical components (not shown) that are at least partially inside or entirely within the housing and including at least a controller, a memory, and a display 410 at or adjacent to the front surface of the housing; and a cover substrate 412 at or over the front surface of the housing such that it is over the display. In some embodiments, at least one of the cover substrate 412 or a portion of housing 402 may include any of the glass articles disclosed herein.

EXAMPLES

The following examples describe various features and advantages provided by the disclosure, and are in no way intended to limit the invention and appended claims.

Example 1

Samples of Glass 1, Glass 2, and Glass 3 were treated as described below. The samples were not ion exchanged. Glass 1 had an approximate composition on an oxide basis of 67.37 mol % $SiO_2$; 3.67 mol % $B_2O_3$; 12.73 mol % $Al_2O_3$; 13.77 mol % $Na_2O$; 0.01 mol % $K_2O$; 2.39 mol % MgO; 0.003 mol % $TiO_2$; 0.01 mol % $Fe_2O_3$; 0.01 mol % $ZrO_2$; and 0.09 mol % $SnO_2$. Glass 2 had an approximate composition on an oxide basis of 67.81 mol % $SiO_2$; 9.74 mol % $B_2O_3$; 11.00 mol % $Al_2O_3$; 2.26 mol % MgO; 8.60 mol % CaO; 0.50 mol % SrO; 0.01 mol % $Fe_2O_3$; and 0.06 mol % $SnO_2$. Glass 3 had an approximate composition on an oxide basis of 66.37 mol % $SiO_2$; 0.60 mol % $B_2O_3$; 10.29 mol % $Al_2O_3$; 13.80 mol % $Na_2O$; 2.40 mol % $K_2O$; 5.74 mol % MgO; 0.003 mol % $TiO_2$; 0.59 mol % CaO; and 0.21 mol % $SnO_2$. Samples of Glass 1 were etched in 5 to 10 wt % hydrochloric acid at 95° C. from 1 to 24 hours. Samples of Glass 2 were etched in 5 wt % hydrochloric acid at 95° C. for 24 hours. In addition, samples of Glass 3 were etched in 5 wt % hydrochloric acid at 95° C. for 24 hours. All samples were rinsed in deionized water and dried at room temperature after the etching step. Note that both primary surfaces of each sample were subjected to the etching and cleaning treatment steps. The resulting samples are textured glass articles consistent with the textured glass articles 100a outlined earlier in the disclosure.

The treated samples were then characterized for surface roughness ($R_a$), haze, and sparkle; and the results are listed below in Table 1. Note that all sparkle measurements were conducted according to the protocol outlined earlier in the disclosure with a display having a density of 210 pixels per square inch. Overall, as demonstrated by Table 1, the textured glass articles comprising Glass 1 exhibited haze levels that varied from 0% to 100% and surface roughness ($R_a$) from about 0.42 nm to 243 nm. The haze levels for Glass 2 and Glass 3 were 20% and 7%, respectively. Generally, haze levels and surface roughness levels increased with increasing acid concentration and/or acid residence time between the samples. Further, the sparkle levels for all of the samples were below 2%.

TABLE 1

| Sample No. | Glass | HCl Conc. (wt %) | Treatment Time (hr) | Temperature (° C.) | Transmittance Haze (%) | $R_a$ (nm) | Sparkle (%) |
| --- | --- | --- | --- | --- | --- | --- | --- |
| 1 | 1 | 10 | 24 | 95 | 100.00 | *** | <2% |
| 2 | 1 | 5 | 24 | 95 | 21.01 | *** | <2% |
| 3 | 1 | 5 | 1 | 95 | 0.00 | *** | <2% |
| 4 | 1 | n/a | n/a | 95 | 0.00 | *** | <2% |
| 5 | 1 | 7.5 | 8 | 95 | 6.17 | 4.28 | <2% |
| 6 | 1 | 10 | 24 | 95 | 100.00 | 243 | <2% |
| 7 | 1 | 10 | 1 | 95 | 0.00 | *** | <2% |
| 8 | 1 | 5 | 1 | 95 | 0.00 | 0.42 | <2% |
| 9 | 1 | 5 | 24 | 95 | 20.93 | 8.32 | <2% |
| 10 | 1 | 7.5 | 8 | 95 | 7.16 | *** | <2% |
| 11 | 1 | 10 | 1 | 95 | 0.00 | 1 | <2% |
| 12 | 2 | 5 | 24 | 95 | 20 | 88 | <2% |
| 13 | 3 | 5 | 24 | 95 | 7 | 14 | <2% |

Further, FIG. 5 is an optical micrograph of one of the textured glass articles comprising a Glass 1 substrate treated with a leaching step conducted at 95° C. for 24 hours with 10 wt % HCl. As is evident from FIG. 5, the exposed features of the textured region associated with the sample are 1 micron or less in size. FIG. 6A is an optical micrograph of one of the textured glass articles comprising a Glass 3 substrate treated with a leaching step conducted at 95° C. for 24 hours with 5 wt % HCl. As is evident from FIG. 6A, the exposed features of the textured region associated with the sample are 1 micron or less in size. Finally, FIG. 6B is an optical micrograph of one of the textured glass articles comprising a Glass 2 substrate treated with a leaching step conducted at 95° C. for 24 hours with 5 wt % HCl. As is evident from FIG. 6B, the exposed features of the textured region associated with the sample are 1 micron or less in size.

Example 2

Glass 1 samples were etched in 9 wt % hydrochloric acid at 95° C. for 8 hours. All samples were rinsed in deionized water and dried at room temperature after the etching step. The samples were then subjected to specimen preparation techniques as understood by those with ordinary skill in the field for purposes of scanning transmission electron microscopy (STEM) measurements. The samples were then analyzed using a STEM. As shown in FIGS. 7A-7D, the resulting STEM images show a cross-section of these textured glass articles, as comparable to the textured glass articles 100a depicted in FIGS. 1A and 3A, particularly the textured region 30a with an average thickness of about 179 nm as defined by the primary surface 12a. Further, these images demonstrate that the textured region 30a encompasses a porous, leached layer 40a with pores ranging from about 1 to 10 nm.

Example 3

The following example used samples of Glass 4. Glass 4 had an approximate composition on an oxide basis of 63.76 mol % $SiO_2$; 2.37 mol % $B_2O_3$; 15.05 mol % $Al_2O_3$; 9.24 mol % $Na_2O$; 5.88 mol % $Li_2O$; 1.18 mol % ZnO; 2.47 mol % $P_2O_5$; and 0.05 mol % $SnO_2$. Samples of Glass 4 were etched with 20 wt % citric acid at 95° C. for 10 hours as part of a low pH treatment step. All samples were rinsed in deionized water and dried at room temperature after the etching step. Further, a portion of the samples were subjected to a high pH treatment employing an alkali cleaner having a pH of about 13 at ambient temperature, followed by rinsing in deionized water and ambient temperature drying. The samples were then analyzed using scanning electron microscope (SEM) energy dispersive spectroscopy (EDS) techniques. FIGS. 8A1, 8A2 and 8A3 are a series of SEM-EDS micrographs of the Glass 4 samples in an as-prepared state (i.e., prior to low pH and high pH treatments), as comparable to the glass substrates 10 depicted in FIGS. 1B and 3B. FIGS. 8B1, 8B2 and 8B3 are a series of SEM-EDS images of a portion of the samples, after the low pH treatment and prior to the high pH treatment. As shown by FIGS. 8B1-8B3, a textured region 30a is developed from the low pH treatment with a leached layer 40a. Finally, FIGS. 8C1, 8C2 and 8C3 are a series of SEM-EDS images of a portion of the textured glass articles, after the high pH treatment. As shown by FIGS. 8C1-8C3, a textured region 30b is developed in the samples from the high pH treatment. In particular, the textured region 30b is developed based at least in part on the removal of the leached layer 40a (see FIGS. 8B1-8B3) during the high pH treatment.

Example 4

Samples of Glass 1, Glass 5, and Glass 6 were used in the following example. Glass 5 had an approximate composition on an oxide basis of 64.62 mol % $SiO_2$; 5.14 mol % $B_2O_3$; 13.97 mol % $Al_2O_3$; 13.79 mol % $Na_2O$; 2.40 mol % MgO; 0.003 mol % $TiO_2$; and 0.08 mol % $SnO_2$. Glass 6 had an approximate composition on an oxide basis of 63.60 mol % $SiO_2$; 15.67 mol % $Al_2O_3$; 10.81 mol % $Na_2O$; 6.24 mol % $Li_2O$; 1.16 mol % ZnO; 2.48 $P_2O_5$; and 0.04 mol % $SnO_2$ Samples of Glass 1 were etched with 5 wt % hydrochloric acid at 95° C. for 8 hours as part of a low pH treatment step, followed by rinsing with deionized water and ambient temperature drying. Samples of Glass 5 were etched with 20 wt % citric acid at 95° for 13.5 hours. Further, samples of Glass 6 was were etched with 20 wt % citric acid for 10 hours at 95° C. Further, the samples were subjected to a high pH treatment employing an alkali cleaner having a pH of about 13 at ambient temperature, followed by rinsing in deionized water and ambient temperature drying. The samples were then analyzed using atomic force microscopy (AFM) techniques. FIGS. 9A, 9B and 9C are a series of AFM images of three textured glass articles comprising Glass 1, 5, and 6, respectively. The AFM images in FIGS. 9A-9C demonstrate the surface morphology of the textured region, e.g., as comparable to the textured region 30b of the textured glass articles 100b of the disclosure (see FIGS. 1B and 3B). In particular, the images in FIGS. 9A-9C demonstrate that the average maximum dimension of the exposed features of these textured regions is about 1 micron or less.

FIG. 9A also demonstrates that the average surface roughness ($R_a$) of the textured region of the Glass 1 sample is about 106.4 nm, as calculated from the profile in the upper right portion of the figure.

Example 5

The following example used samples of Glass 4. Glass 4 had an approximate composition on an oxide basis of 63.76 mol % $SiO_2$; 2.37 mol % $B_2O_3$; 15.05 mol % $Al_2O_3$; 9.24 mol % $Na_2O$; 5.88 mol % $Li_2O$; 1.18 mol % ZnO; 2.47 mol % $P_2O_5$; and 0.05 mol % $SnO_2$. Samples of Glass 4 were etched with 20 wt % citric acid at 95° C. for 6 to 13 hours as part of a low pH treatment step. All samples, other than the sample labeled "control", were etched according to an etching step that incorporated a metal salt at a concentration of 1M. Some of the metal salts included multivalent metal salts (i.e., $AlCl_3$, $CaCl_2$ and $FeCl_3$); and the remaining metal salts employed monovalent cations (e.g., CsCl, NaCl, LiCl and KCl). All samples were rinsed in deionized water and dried at room temperature after the etching step.

Figure 10A:
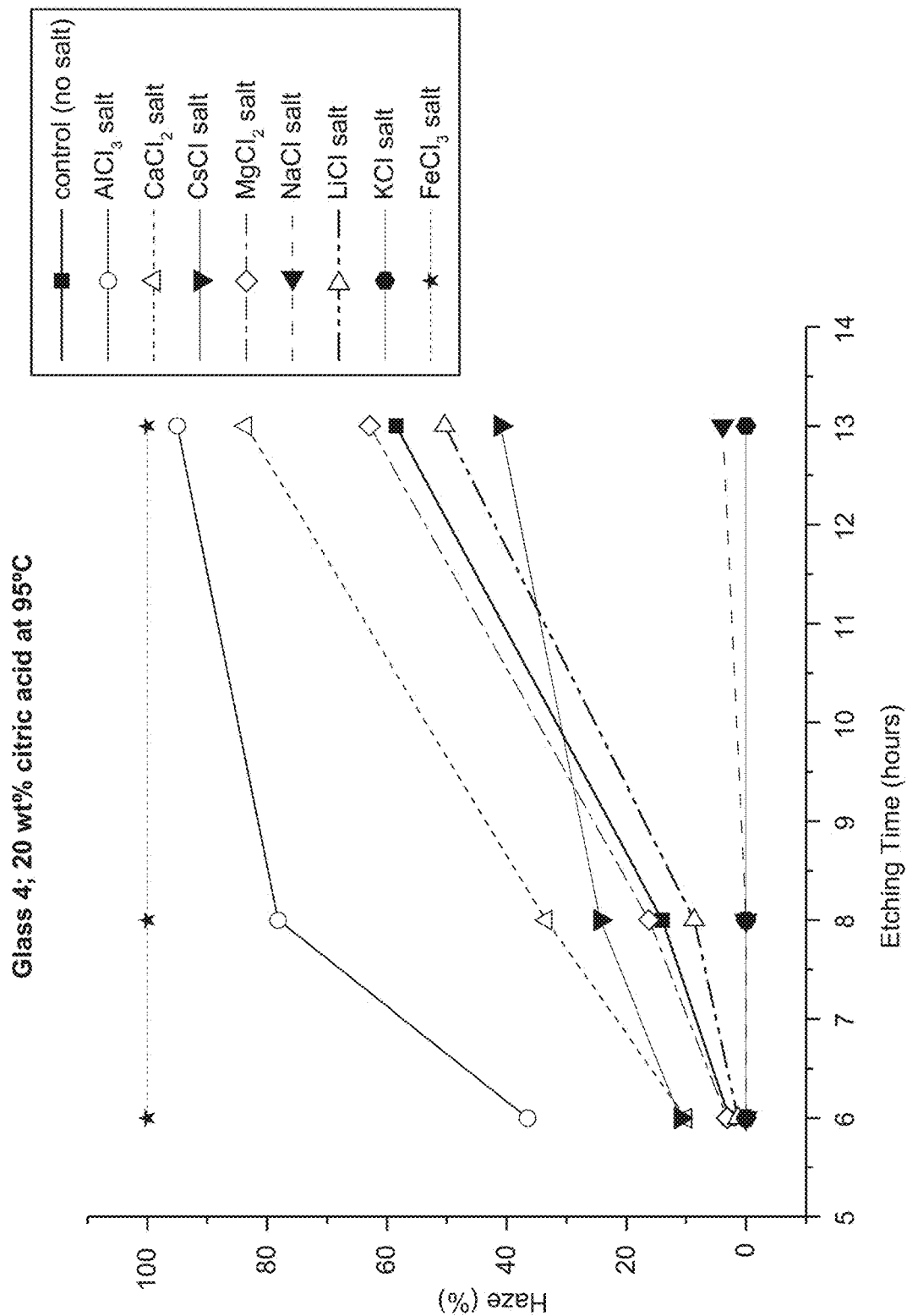
FIG. 10A is a plot of haze vs. etching time for glass substrates etched with citric acid and various additive salts, according to aspects of the disclosure.

Referring to FIG. 10A, a plot of haze (%) vs. etching time is provided for the glass substrates etched with citric acid and various metal salts according to this example. As is evident from FIG. 10A, etching times as low as 6 hours produced haze levels of at least about 40% for etchants employing $FeCl_3$ and $AlCl_3$ salts. In addition, it is evident from FIG. 10A that the effectiveness of the salt in accelerating the etching time of these glass substrates can be ranked as: $FeCl_3$>$AlCl_3$>$CaCl_2$>$MgCl_2$≈CsCl>Control (no salt) >LiCl>NaCl>KCl. Further, it is evident that the etchants with the multivalent metal salt additives (i.e., the $Al^{3+}$, $Fe^{3+}$, $Ca^{2+}$, $Mg^{2+}$ cations) accelerated the texturing process, and adding monovalent metal salt additives (i.e., the $Na^+$, $K^+$ and $Li^+$ cations) slowed the texturing process.

Figure 10B:
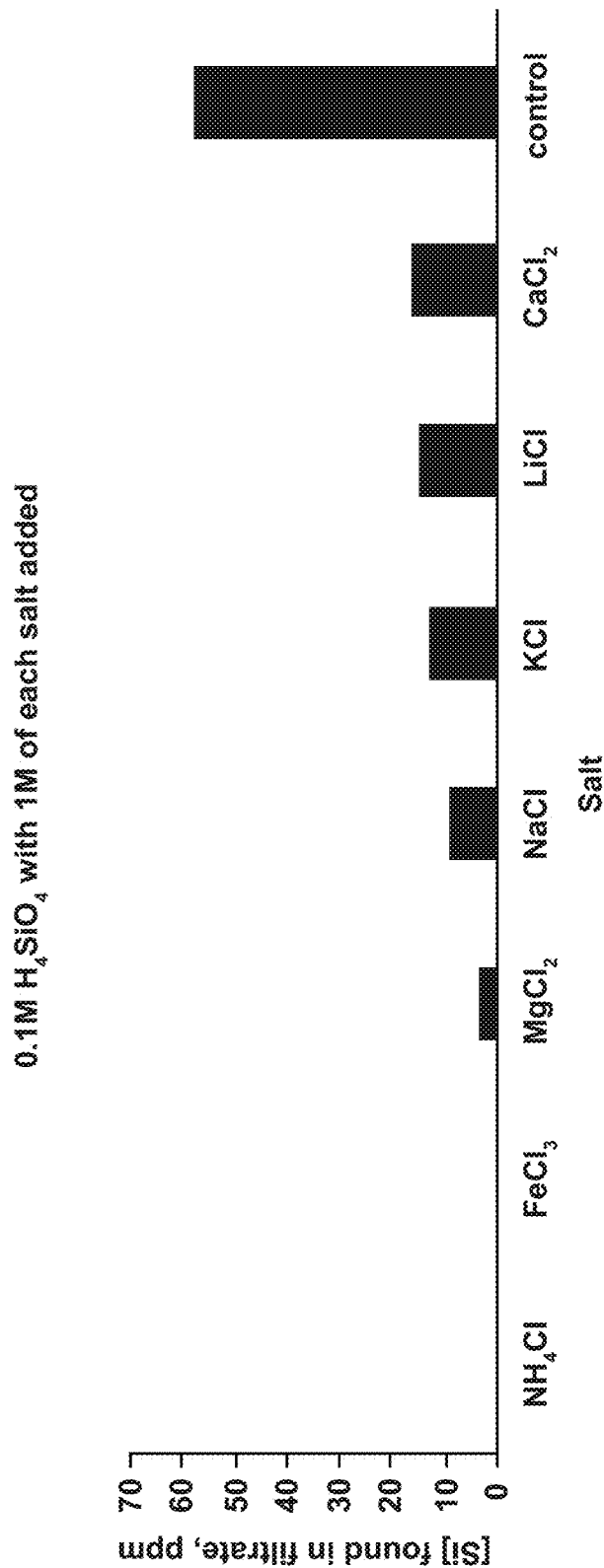
FIG. 10B is a chart of silicon ion concentration remaining in a filtrate upon exposure of silicic acid to various additive salts that promote silica precipitation, according to aspects of the disclosure.

Referring now to FIG. 10B, a chart is provided of silicon ion concentration remaining in a filtrate upon exposure of silicic acid ($H_4SiO_4$) to the various metal salts of this example at a concentration of 1M. As such, this portion of the example assesses the effect of the various metal salts on precipitating silica from silicic acid, e.g., as noted earlier in connection with Reaction 3. As is evident from FIG. 10B, both $NH_4Cl$ and $FeCl_3$ exhibit the highest rates of silicic acid precipitation, as evidenced by a silicon concentration of about 0 ppm measured in the filtrate. Consistent with these results, relatively low etching times were observed in the samples depicted in FIG. 10A etched with citric acid and $FeCl_3$ salt.

Example 6

Figure 11:
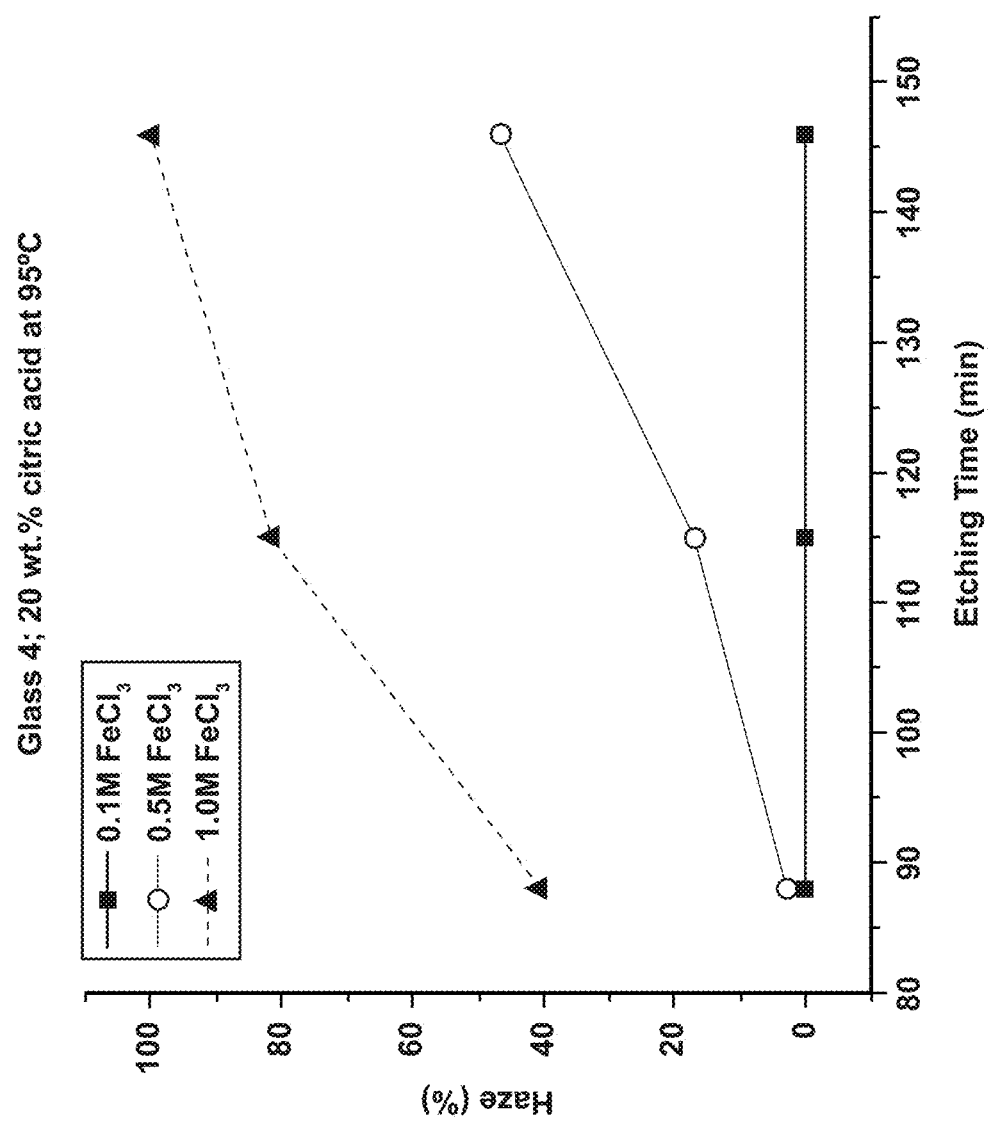
FIG. 11 is a plot of haze vs. etching time for glass substrates etched with citric acid and various concentrations of iron chloride salt, according to aspects of the disclosure.

The following example used samples of Glass 4. Samples of Glass 4 were etched with 20 wt. % citric acid at 95° C. with concentrations of 0.1M, 0.5M and 1.0M of $FeCl_3$ for about 85 minutes to about 145 minutes as part of a low pH treatment step. All samples were rinsed in deionized water and dried at room temperature after the etching step. Referring now to FIG. 11, a plot of haze (%) vs. etching time (minutes) is provided for the glass substrates of this example. As is evident from FIG. 11, increasing the concentration of the $FeCl_3$ in the citric acid etchant tends to lead to higher levels of etching, as manifested in larger haze values, and lower etching times to achieve the same degree of etching. For example, etching times of 115 minutes and 145 minutes with $FeCl_3$ at a concentration of 1M resulted in haze levels in excess of 80%. As another example, an etching time of only 90 minutes was necessary to achieve a haze level of 40% for samples etched with citric acid and 1M FeCl₃ as compared to about 145 minutes for samples etched with citric acid and 0.5M FeCl₃.

Example 7

The following example used samples of Glass 4. Samples of Glass 4 were etched with 20 wt. % citric acid at 95° C. with no additive salt (control), 20 wt. % citric acid at 100° C. with a 1M FeCl₃ salt and 20 wt. % citric acid at 100° C. with a 1M AlCl₃ salt, the etching conducted for these samples from about 1 hour to about 16 hours as part of a low pH treatment step. All samples were rinsed in deionized water and dried at room temperature after the etching step.

Figure 12A:
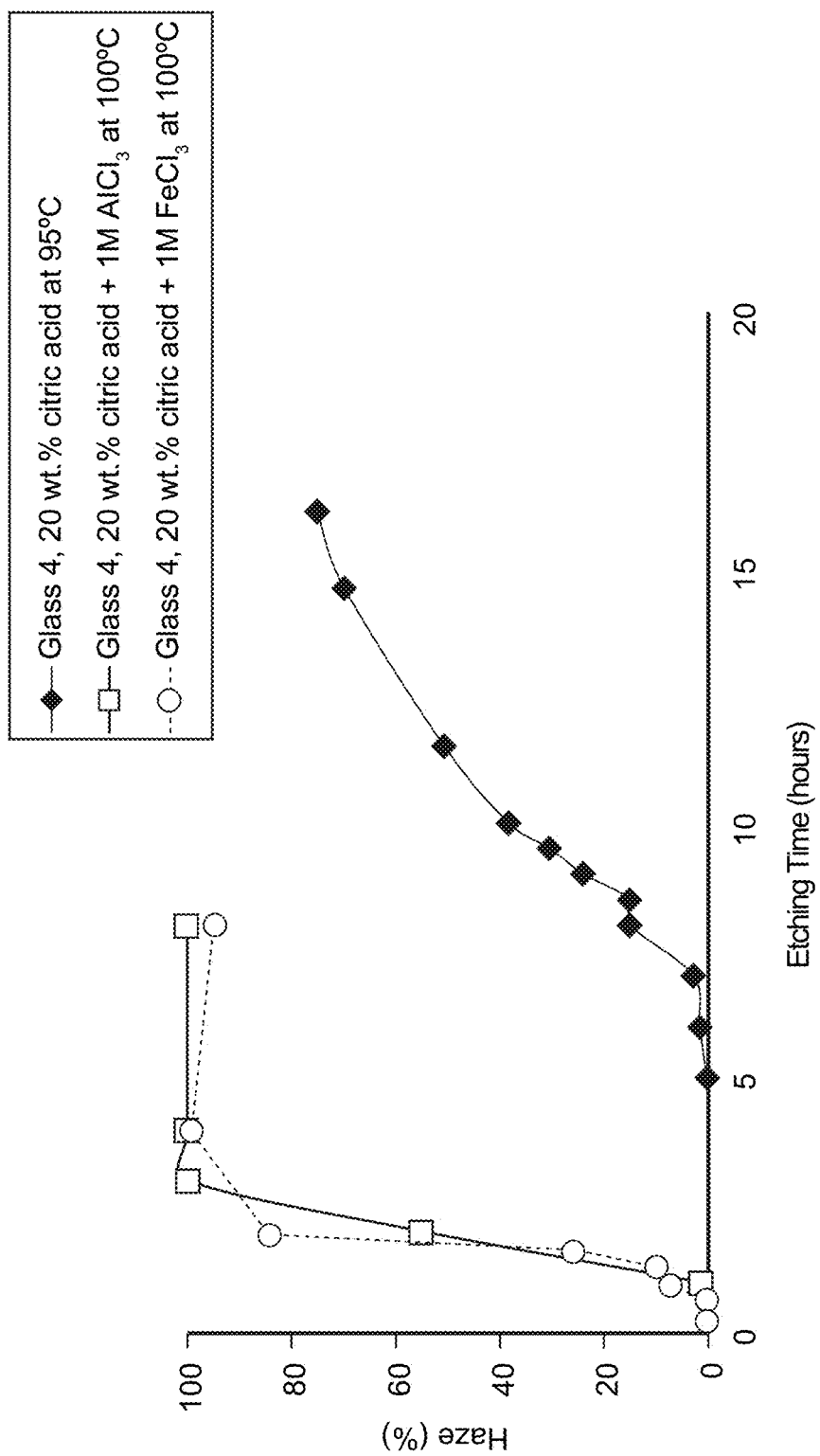
FIG. 12A is a plot of haze vs. etching time for glass substrates etched with citric acid with no salt additives, citric acid and aluminum chloride salt, and citric acid and iron chloride salt, according to aspects of the disclosure.

Referring now to FIG. 12A, a plot of haze (%) vs. etching time (minutes) is provided for the glass substrates of this example, i.e., as etched with citric acid with no additive salts, citric acid and aluminum chloride salt and citric acid and iron chloride salt. As is evident from FIG. 12A, the glass substrates etched with citric acid and aluminum chloride salt or iron chloride salt exhibited markedly lower etching times as compared to the control sample with no additive salt for a particular haze level. For example, an etching time of about 12 hours was necessary to obtain a haze level of 50% for the control sample as compared to an etching time of about 2 hours for the samples employing aluminum chloride salt or iron chloride salt. Further, an etching time of only about 4 hours to obtain a haze of about 100% was necessary for the samples employing aluminum chloride salt or iron chloride salt.

Figure 12B:
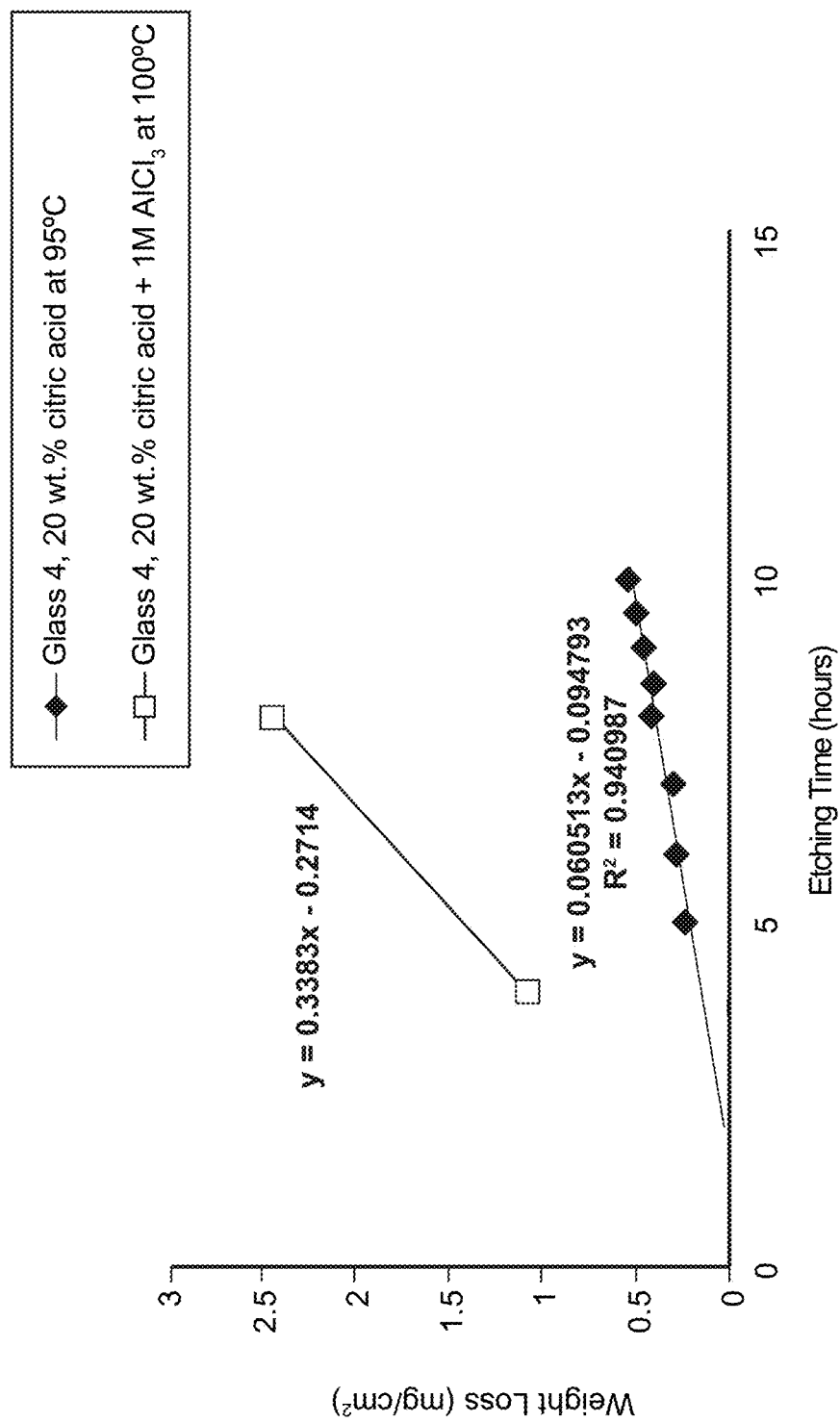
FIG. 12B is a plot of weight loss vs. etching time for glass substrates etched with citric acid with no additive salts and citric acid with aluminum chloride salt, according to aspects of the disclosure.

Referring now to FIG. 12B, a plot of weight loss (mg/cm²) vs. etching time (hours) is provided for glass substrates etched with citric acid with no additive salts and citric acid with aluminum chloride salt, according to aspects of the disclosure. As is evident from FIG. 12B, the glass substrates etched with citric acid and aluminum chloride salt experienced a weight loss rate about five times greater than those of the control samples. This is evident from the linear fits of each of the data sets of weight loss vs. etching time (i.e., y=0.3383x−0.2714 for the citric acid/AlCl₃ samples and y=0.060513x−0.094793 for the citric acid control samples). Hence, the glass substrates etched with citric acid and aluminum chloride developed a surface texture about five times faster than those of the control samples etched solely with citric acid.

Example 8

The following example used samples of Glass 4. Samples of Glass 4 were etched with 20 wt. % citric acid at 100° C. with no additive salt (control), 20 wt. % citric acid at 100° C. with a 1M FeCl₃ salt and 20 wt. % citric acid at 100° C. with a 1M AlCl₃ salt, the etching conducted for these samples at 2.5 hours or 8.5 hours as part of a low pH treatment step. All samples were rinsed in deionized water and dried at room temperature after the etching step.

Figure 13:
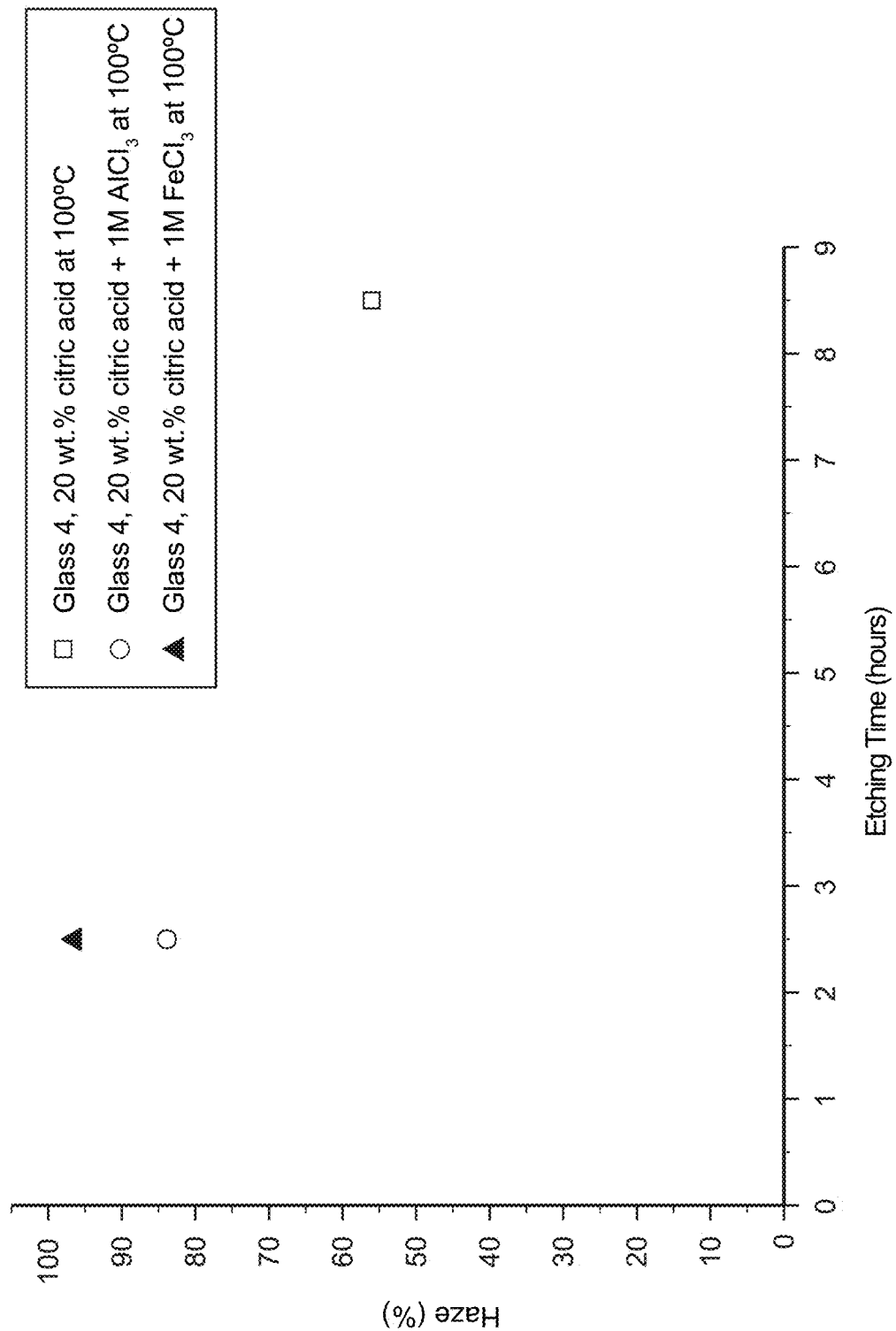
FIG. 13 is a plot of haze vs. etching time for glass substrates etched with citric acid with no salt additives, citric acid and aluminum chloride salt, and citric acid and iron chloride salt, according to aspects of the disclosure.

Referring now to FIG. 13, a plot of haze (%) vs. etching time (minutes) is provided for the glass substrates of this example, i.e., as etched with citric acid with no additive salts, citric acid and aluminum chloride salt, and citric acid and iron chloride salt. As is evident from FIG. 13, the glass substrates etched with citric acid and aluminum chloride salt or iron chloride salt exhibited a haze level exceeding 85% for an etching time of 2.5 hours. In contrast, the control sample with no additive salt required a much longer etching time of 8.5 hours to achieve a lower degree of haze, a haze level of about 55%.

Example 9

The following example used samples of Glass 7. Glass 7 had an approximate composition on an oxide basis of 63.30 mol % SiO₂; 6.74 mol % B₂O₃; 15.18 mol % Al₂O₃; 4.32 mol % Na₂O; 6.84 mol % Li₂O; 1.02 mol % MgO; 1.55 mol % CaO; 0.03 mol % SnO₂; and 1.03 mol % SrO. Samples of Glass 7 were etched with 20 wt. % citric acid at 95° C. with no salt additive (control), and 20 wt. % citric acid at 95° C. with a 1M AlCl₃ salt, the etching conducted for these samples from about 1 hour to about 3 hours as part of a low pH treatment step. All samples were rinsed in deionized water and dried at room temperature after the etching step.

Figure 14:
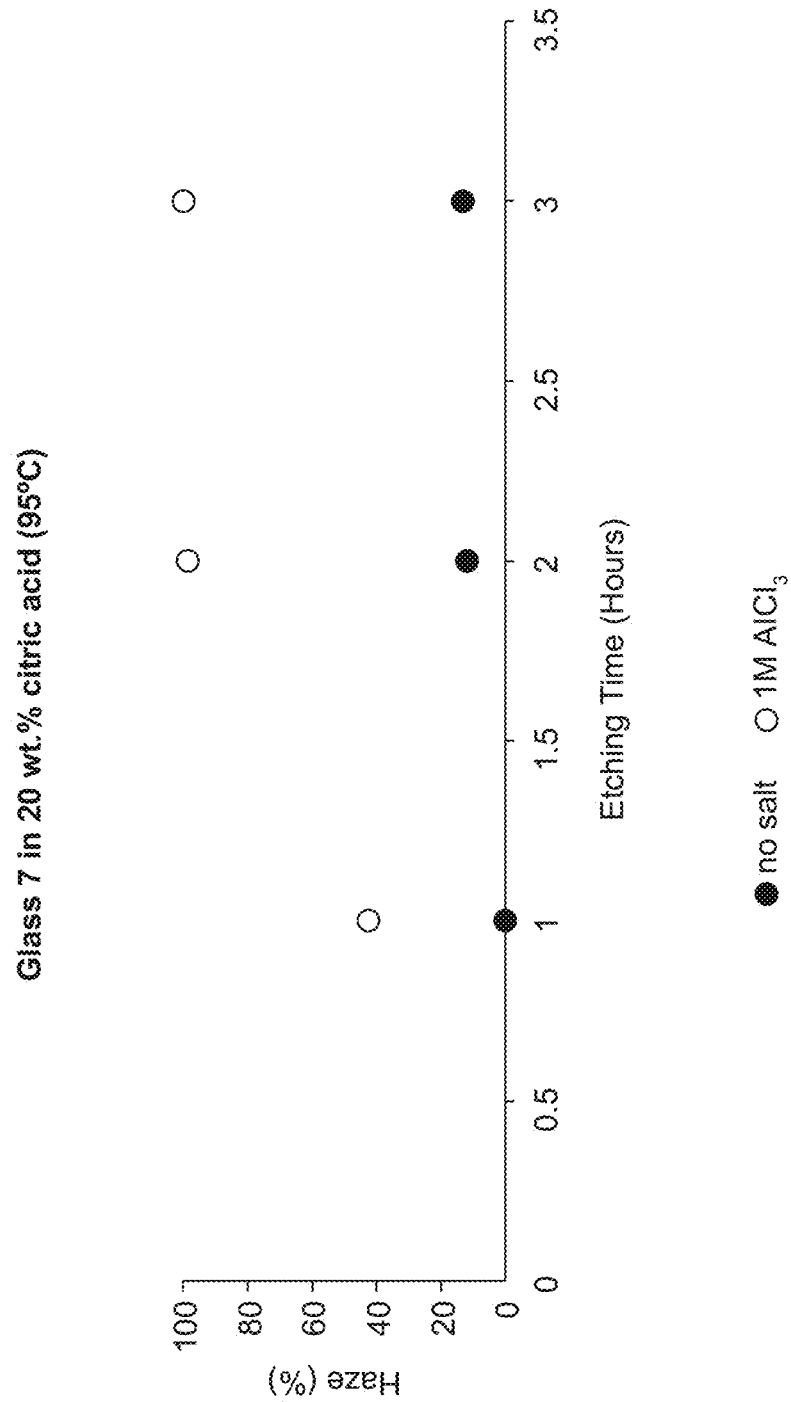
FIG. 14 is a plot of haze vs. etching time for glass substrates etched with citric acid with no additive salts and citric acid with aluminum chloride salt, according to aspects of the disclosure.

Referring now to FIG. 14, a plot of haze (%) vs. etching time (minutes) is provided for the glass substrates of this example, i.e., as etched with citric acid with no additive salts, and citric acid with aluminum chloride salt. As is evident from FIG. 14, the glass substrates etched with citric acid and aluminum chloride salt exhibited markedly higher haze levels for the same etching times as compared to the control sample with no additive salts. For example, an etching time of about 3 hours resulted in a haze level of about 100% for the glass substrates etched with citric acid at 95° C. with a 1M AlCl₃ salt and a haze level of less than 20% for the glass substrate control samples etched with citric acid at 95° C. with no salt additive.

Example 10

The following example used samples of Glass 5. Samples of Glass 5 were etched with 20 wt. % citric acid at 95° C. with no additive salt, the etching conducted for these samples from about 8 hours to about 24 hours as part of a low pH treatment step. All samples were rinsed in deionized water and dried at room temperature after the etching step.

Figure 15:
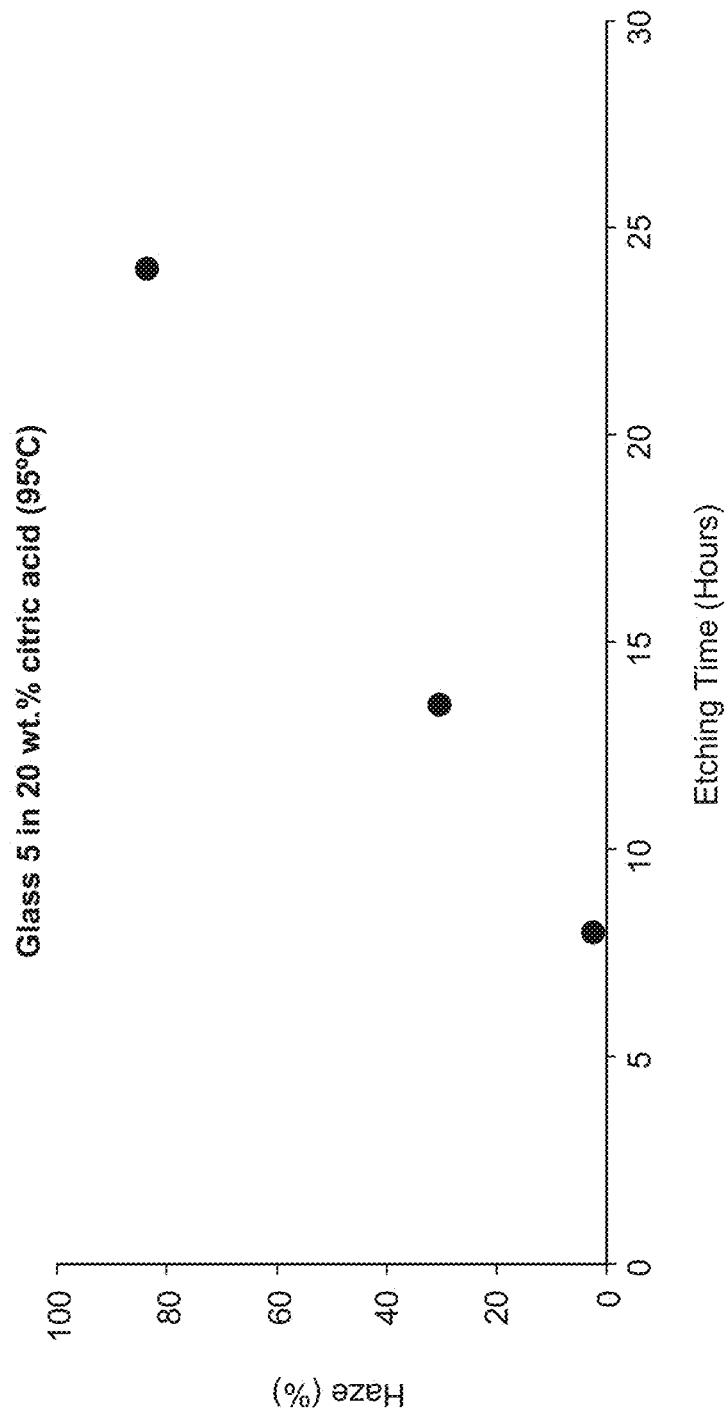
FIG. 15 is a plot of haze vs. etching time for a glass substrate etched with citric acid with no additive salts, according to an aspect of the disclosure.

Referring now to FIG. 15, a plot of haze (%) vs. etching time (minutes) is provided for the glass substrates of this example, i.e., as etched with citric acid with no additive salts. As is evident from FIG. 15, the glass substrates comprising Glass 5 etched with citric acid exhibited increasing levels of haze from about 5% to about 80% as etching time was increased from about 8 hours to 24 hours, respectively.

Example 11

Figure 16:
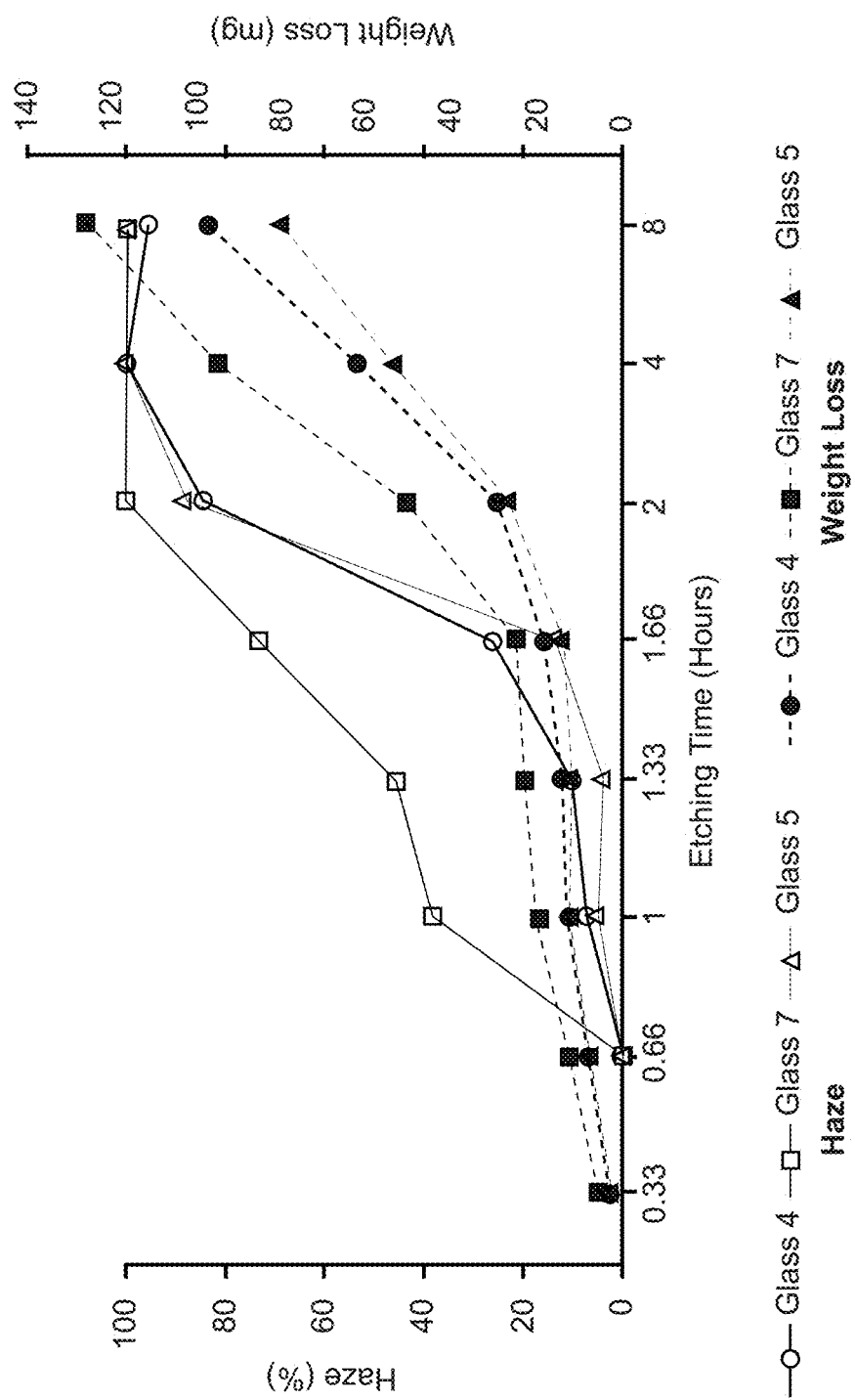
FIG. 16 is a plot of haze vs. etching time for various glass substrates etched with citric acid and iron chloride salt, according to an aspect of the disclosure.

The following example used samples of Glass 4, Glass 5 and Glass 7. Samples of Glass 4, Glass 5 and Glass 7 were etched with 20 wt. % citric acid at 100° C. with 1M concentrations of FeCl₃ for about 0.33 hours to about 8 hours as part of a low pH treatment step. All samples were rinsed in deionized water and dried at room temperature after the etching step. Referring now to FIG. 16, a plot of haze (%) and weight loss (mg) vs. etching time (hours) is provided for the glass substrates of this example. As is evident from FIG. 16, haze levels exceeding 80% were obtained for each of the glass substrate samples (i.e., Glass 4, Glass 5 and Glass 7) at etching times of about 2 hours or more employing citric acid and 1M FeCl₃ at 100° C. Similarly, haze levels approaching 100% were obtained for each of the glass substrate samples at etching times of about 4 hours or more. Further, weight loss rates observed in the samples tended to correlate with increasing haze levels observed as a function of etching time.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A textured glass article, comprising:
a glass substrate comprising a thickness, a primary surface and a bulk composition at the midpoint of the thickness; and
a textured region defined by the primary surface and comprising a textured region composition, the textured region including a plurality of exposed features, each of the plurality of exposed features having a peak and a valley,
wherein the textured region comprises a sparkle of 2% or less, and the plurality of exposed features has a surface roughness ($R_a$) from about 10 nm to 243 nm,
further wherein the bulk composition comprises about 40 mol % to 80 mol % silica and the textured region composition comprises at least about 40 mol % silica; and
further wherein the textured region composition comprises a higher amount of silica than the silica in the bulk composition.

2. The article according to claim 1, wherein the textured region comprises a porous layer.

3. The article according to claim 1, wherein the bulk composition is selected from the group consisting of an aluminosilicate glass, a borosilicate glass, and a phosphosilicate glass.

4. The article according to claim 1, wherein the primary surface has a compressive stress of at least 350 MPa.

5. The article according to claim 1, wherein the textured region composition comprises about 70 mol % silica and the bulk composition comprises about 50 mol % silica.

6. The article according to claim 1, wherein the glass substrate further comprises a compressive stress region that extends from the primary surface to a selected depth.

7. The article according to claim 6, further comprising an easy-to-clean (ETC) coating disposed over the textured region, the ETC coating comprising a fluorosilane.

8. The article according to claim 1, wherein the article is characterized by a haze from greater than 0% to 100%.

9. A consumer electronic product, comprising:
a housing having a front surface, a back surface and side surfaces;
electrical components provided at least partially within the housing, the electrical components including at least a controller, a memory, and a display, the display being provided at or adjacent the front surface of the housing; and
a cover glass disposed over the display,
wherein at least one of a portion of the housing or the cover glass comprises the article of claim 1.

10. A textured glass article, comprising:
a glass substrate comprising a thickness, a primary surface and a bulk composition at the midpoint of the thickness; and
a textured region defined by the primary surface and comprising a textured region composition,
wherein the textured region comprises a sparkle of 2% or less and a plurality of exposed features, each exposed feature having a peak and a valley, and the plurality of exposed features having an average maximum dimension of less than 5 microns in a plane defined by the primary surface, the maximum dimension being the greatest distance from one portion of a peak of the exposed feature to another portion of the peak of the exposed feature,
further wherein the bulk composition comprises about 40 mol % to 80 mol % silica and the textured region composition comprises at least about 40% silica; and
further wherein the textured region composition comprises a higher amount of silica than the silica in the bulk composition.

11. The article according to claim 10, wherein the textured region further comprises a surface roughness ($R_a$) from about 10 nanometers to about 500 nanometers;
and wherein the article is characterized by a haze of at least 40%.

12. The article according to claim 10, wherein the bulk composition is selected from the group consisting of an aluminosilicate glass, a borosilicate glass, and a phosphosilicate glass.

13. The article according to claim 10, wherein textured region composition comprises about 70 mol % silica and the bulk composition comprises about 50 mol % silica.

14. The article according to claim 10, wherein the primary surface has a compressive stress of at least 350 MPa.

15. The article according to claim 10, wherein the glass substrate further comprises a compressive stress region that extends from the primary surface to a selected depth.

16. The article according to claim 15, further comprising an easy-to-clean (ETC) coating disposed over the textured region, the ETC coating comprising a fluorosilane.

17. The article according to claim 16, wherein the article is characterized by a haze from greater than 0% to 100%.

18. A consumer electronic product, comprising:
a housing having a front surface, a back surface and side surfaces;
electrical components provided at least partially within the housing, the electrical components including at least a controller, a memory, and a display, the display being provided at or adjacent the front surface of the housing; and
a cover glass disposed over the display,
wherein at least one of a portion of the housing or the cover glass comprises the article of claim 15.

19. A textured glass article comprising:
a glass substrate comprising a thickness, a primary surface, and a bulk composition at a midpoint of the thickness, the bulk composition comprising 40 mol % to 80 mol % silica; and
a textured region bound by the primary surface, the textured region comprising (i) a textured region composition, (ii) a plurality of exposed features at the primary surface having an average maximum dimension of 1 micron or less in a plane defined by the primary surface, each of the plurality of exposed features having a peak and a valley, and the maximum dimension being the greatest distance from one portion of a peak of the exposed feature to another portion of the peak of the exposed feature, and (iii) a surface roughness (Ra) within a range of 10 nm to 500 nm,
wherein the textured glass article comprises a sparkle of 2% or less and a haze of 25% or less; and
further, wherein the textured region composition comprises a higher mole percentage of silica from the bulk composition.

20. The textured glass article of claim 19, wherein the primary surface has a compressive stress of at least 350 MPa.

21. The textured glass article of claim 19, wherein the textured region is porous.

22. The textured glass article of claim 19, wherein
the surface roughness ($R_a$) is within a range of 4.28 nm to 88 nm; and
the haze is within a range of 6.17% to 20%.

23. The textured glass article of claim 19, wherein
the textured region composition comprises about 70 mol % silica and the bulk composition comprises about 50 mol % silica.

24. The textured glass article of claim 19, wherein the bulk composition further comprises alumina and at least one alkali metal.

25. The textured glass article of claim 19 further comprising:
an easy-to-clean coating disposed over the textured region, the easy-to-clean coating comprising at least one amphiphobic substance having fluorine termination groups.

26. A textured glass article comprising:
a glass substrate comprising a thickness, a primary surface, and a bulk composition at a midpoint of the thickness, the bulk composition comprising 40 mol % to 80 mol % silica; and
a textured region bound by the primary surface, the textured region comprising (i) a textured region composition, (ii) a plurality of exposed features at the primary surface having an average maximum dimension of 1 micron or less in a plane defined by the primary surface, each of the plurality of exposed features having a peak and a valley, and the maximum dimension being the greatest distance from one portion of a peak of the exposed feature to another portion of the peak of the exposed feature, and (iii) a surface roughness (Ra) within a range of 10 nm to 500 nm,
wherein the textured glass article comprises a sparkle of 2% or less and a haze of 25% or less; and
further wherein the textured region is porous.

27. The textured glass article of claim 26, wherein the primary surface has a compressive stress of at least 350 MPa.

28. The textured glass article of claim 26, wherein
the surface roughness ($R_a$) is within a range of 4.28 nm to 88 nm; and
the haze is within a range of 6.17% to 20%.

29. The textured glass article of claim 26 further comprising an easy-to-clean coating disposed over the textured region, the easy-to-clean coating comprising at least one amphiphobic substance having fluorine termination groups.

* * * * *

UNITED STATES PATENT AND TRADEMARK OFFICE
CERTIFICATE OF CORRECTION

PATENT NO. : 11,208,344 B2
APPLICATION NO. : 15/915325
DATED : December 28, 2021
INVENTOR(S) : Robert Randall Hancock, Jr. et al.

Page 1 of 1

It is certified that error appears in the above-identified patent and that said Letters Patent is hereby corrected as shown below:

In the Claims

In Column 24, Line 20, Claim 13, delete "wherein" and insert -- wherein the --.

In Column 24, Line 63, Claim 19, delete "from" and insert -- than --.

Signed and Sealed this
Seventh Day of January, 2025

Derrick Brent
*Acting Director of the United States Patent and Trademark Office*